United States Patent
Paradise et al.

(10) Patent No.: US 9,479,602 B1
(45) Date of Patent: Oct. 25, 2016

(54) EVENT PLATFORM FOR PEER-TO-PEER DIGITAL GAMING COMPETITION

(71) Applicant: Skillz, Inc., Boston, MA (US)

(72) Inventors: Andrew Paradise, Boston, MA (US); Dennis Zografos, Somerville, MA (US)

(73) Assignee: Skillz Inc., Boston, MA (US)

( * ) Notice: Subject to any disclaimer, the term of this patent is extended or adjusted under 35 U.S.C. 154(b) by 0 days.

(21) Appl. No.: 14/717,621

(22) Filed: May 20, 2015

(51) Int. Cl.
  *G06F 17/00* (2006.01)
  *H04L 29/08* (2006.01)
  *A63F 13/216* (2014.01)
  *A63F 13/34* (2014.01)
  *A63F 13/792* (2014.01)

(52) U.S. Cl.
  CPC ............ *H04L 67/18* (2013.01); *A63F 13/216* (2014.09); *A63F 13/34* (2014.09); *A63F 13/792* (2014.09); *H04L 67/104* (2013.01)

(58) Field of Classification Search
  USPC ................................................ 463/6–9, 16–25
  See application file for complete search history.

(56) References Cited

U.S. PATENT DOCUMENTS

| | | | |
|---|---|---|---|
| 5,411,258 A | 5/1995 | Wilson et al. | |
| 6,676,517 B2 | 1/2004 | Beavers | |
| 6,699,127 B1 | 3/2004 | Lobb et al. | |
| 8,545,330 B2 | 10/2013 | Wickett et al. | |
| 8,562,422 B2 | 10/2013 | Lutnick | |
| 8,568,222 B2 | 10/2013 | Gagner et al. | |
| 8,613,662 B2 | 12/2013 | Morrow et al. | |
| 8,641,511 B2 | 2/2014 | Ginsberg et al. | |
| 8,651,948 B2 | 2/2014 | Asher et al. | |
| 8,683,272 B2 | 3/2014 | Cadima et al. | |
| 8,715,077 B2 | 5/2014 | Paradise et al. | |
| 8,900,054 B2 | 12/2014 | Patel | |
| 8,926,435 B2 * | 1/2015 | Perry | A63F 13/12 463/42 |
| 2002/0160824 A1 | 10/2002 | Goto et al. | |
| 2005/0043089 A1 | 2/2005 | Nguyen et al. | |
| 2005/0090307 A1 | 4/2005 | Walker et al. | |
| 2007/0004509 A1 | 1/2007 | Banton | |
| 2007/0072676 A1 | 3/2007 | Baluja | |
| 2007/0136817 A1* | 6/2007 | Nguyen | G06F 21/10 726/26 |
| 2008/0161113 A1 | 7/2008 | Hansen et al. | |
| 2008/0207327 A1 | 8/2008 | Van Luchene et al. | |
| 2008/0214301 A1 | 9/2008 | Sandige et al. | |
| 2008/0234047 A1* | 9/2008 | Nguyen | G07F 17/32 463/42 |
| 2009/0099924 A1 | 4/2009 | Lensch et al. | |
| 2009/0170608 A1 | 7/2009 | Herrmann et al. | |
| 2009/0208181 A1 | 8/2009 | Cottrell | |
| 2009/0209350 A1 | 8/2009 | Kelly et al. | |

(Continued)

*Primary Examiner* — Ronald Laneau
(74) *Attorney, Agent, or Firm* — Mintz Levin Cohn Ferris Glovsky and Popeo, P.C.

(57) ABSTRACT

Data is received identifying a peer-to-peer gaming event and comprising a request to register for the peer-to-peer gaming event, the request originating from peer-to-peer gaming platform software executing on a client. The client is remote from at least one data processor. The peer-to-peer event is a geographically restricted peer-to-peer gaming competition having a plurality of participants each playing a skill-based digital game. The client is associated with the peer-to-peer gaming event. That the client satisfies a geographical location requirement of the peer-to-peer gaming event is determined. The determining is based on the received data and a geolocation of the client. Provision of the skill-based digital game to the client during the peer-to-peer gaming event is caused. The skill-based digital game exchanges game data with a game server remote from the at least one data processor and the client. Related apparatus, systems, techniques and articles are also described.

24 Claims, 39 Drawing Sheets

(56) References Cited

U.S. PATENT DOCUMENTS

| | | |
|---|---|---|
| 2009/0215540 A1* | 8/2009 | Perlman .......... A63F 13/12 463/42 |
| 2010/0022307 A1 | 1/2010 | Steuer et al. |
| 2010/0144426 A1 | 6/2010 | Winner et al. |
| 2010/0241699 A1 | 9/2010 | Muthukumarasamy et al. |
| 2010/0304860 A1 | 12/2010 | Gault et al. |
| 2011/0010386 A1 | 1/2011 | Zeinfeld |
| 2011/0072056 A1 | 3/2011 | Bakalash et al. |
| 2012/0004039 A1* | 1/2012 | Perry .......... A63F 13/12 463/42 |
| 2012/0013622 A1 | 1/2012 | Mahajan et al. |
| 2012/0028718 A1 | 2/2012 | Barclay et al. |
| 2012/0122553 A1 | 5/2012 | Bunch et al. |
| 2012/0156668 A1 | 6/2012 | Zelin |
| 2012/0178514 A1 | 7/2012 | Schulzke et al. |
| 2012/0281080 A1 | 11/2012 | Wang |
| 2013/0121614 A1 | 5/2013 | Intwala |
| 2013/0172086 A1 | 7/2013 | Ikenaga |
| 2013/0226983 A1 | 8/2013 | Beining et al. |
| 2013/0272987 A1 | 10/2013 | Liu et al. |
| 2013/0331177 A1 | 12/2013 | Arnone et al. |
| 2013/0339473 A1 | 12/2013 | McCaffrey et al. |
| 2013/0344960 A1 | 12/2013 | Perry et al. |
| 2014/0024427 A1 | 1/2014 | Cole et al. |
| 2014/0024437 A1 | 1/2014 | Vann et al. |
| 2014/0031132 A1 | 1/2014 | Wickett et al. |
| 2014/0045589 A1 | 2/2014 | Paradise et al. |
| 2014/0094267 A1 | 4/2014 | Davis et al. |
| 2014/0100023 A1 | 4/2014 | Arnone et al. |
| 2014/0128147 A1 | 5/2014 | Yu Cheng et al. |
| 2014/0194188 A1 | 7/2014 | Kosta et al. |
| 2014/0200062 A1 | 7/2014 | Paradise et al. |

\* cited by examiner

EVENT PLATFORM FOR PEER-TO-PEER DIGITAL GAMING COMPETITION

TECHNICAL FIELD

The subject matter described herein relates to an event platform for a peer-to-peer digital gaming competition.

BACKGROUND

Electronic sports (also known as eSports or competitive gaming) is a term for organized multiplayer video game competitions. Common video game genres associated with electronic sports include real-time strategy, fighting, first-person shooter, and battle arena. ESport events can include community-organized gatherings of eSports fans in a bar or restaurant. At a these events, attendees will watch eSports video streams of one another's game-play while enjoying food and socializing with other eSport enthusiasts.

Bars calling themselves "eSports Bars" have arisen. These bars are similar to the traditional sports bars, but instead of broadcasting sports like football and soccer, they broadcast a variety of eSports games instead. Many of these bars also have computers set up to allow customers to play games with each other, and often host in house tournaments as well.

But outside of bars dedicated to eSports, eSporting events are generally organized in an ad-hoc manner, requiring significant time investment by an organizer to prepare the venue, advertise the event, collect entry fees, determine competition winners, and distribute prizes. Venues often lack sufficient network connections for gaming consoles or computer systems used in the competition. While many bars have television, often these bars and other venues lack appropriate audio/video and related equipment, (such as A/V connectors, adaptors, power outlets, power cords, and the like) to display event participant game-play and/or connect to gaming consoles and/or computing systems. In addition, games played by event participants often vary in difficulty (and therefore player outcome varies) because the game may present a different scenario each time the game is played. Such a condition makes it challenging to determine event competition winners or rankings in a fair manner.

SUMMARY

In an aspect, data is received by at least one data processor, the data identifying a peer-to-peer gaming event and comprising a request to register for the peer-to-peer gaming event, the request originating from peer-to-peer gaming platform software executing on a client. The client is remote from the at least one data processor. The peer-to-peer event is a geographically restricted peer-to-peer gaming competition having a plurality of participants each playing a skill-based digital game. The client is associated with the peer-to-peer gaming event. That the client satisfies a geographical location requirement of the peer-to-peer gaming event is determined. The determining is based on the received data and a geolocation of the client. Provision of the skill-based digital game to the client during the peer-to-peer gaming event is caused. The skill-based digital game exchanges game data with a game server remote from the at least one data processor and the client.

One or more of the following features can be included in any feasible combination. For example, determining that the client satisfies the geographical location requirement can include receiving data characterizing a location of the client according to a geolocation system of the client; and comparing the location of the client to a predefined geolocation of the peer-to-peer event. The geolocation system of the client can be a global positioning system (GPS) service or a local positioning system (LPS) utilizing beacons. The skill-based digital game can be a single player game or a multiplayer game. A video feed recording in-game actions can be generated by, using the peer-to-peer gaming platform, capturing an interface display space of the skill-based digital game and broadcasting the capture to peer-to-peer gaming platforms of one or more additional clients participating in the peer-to-peer event. Generating the video feed can include simultaneously broadcasting the capture and a second capture of in-game actions of another client to enable comparison of the in-game actions between participants of the peer-to-peer gaming event. The another client can be selected based on a ranking of performance of the second client in the peer-to-peer gaming competition.

Data characterizing historical skill-based gaming metrics for one or more peer-to-peer event participants and historical skill-based gaming metrics for a potential peer-to-peer event participant can be accessed. Using the accessed data, a targeted advertisement to present to the potential peer-to-peer event participant can be determined. The targeted advertisement can specify the skill-based digital game and a characterization of the historical skill-based gaming metrics for the one or more peer-to-peer event participants. An advertisement display space can be caused to be modified to include the targeted advertisement. The targeted advertisement can prompt the potential peer-to-peer event participant to, using a peer-to-peer gaming platform, request to register for the peer-to-peer event.

Funds previously deposited by the user as an event entry fee can be secured for a user associated with the client. Data characterizing a confirmation that the funds were successfully secured can be transmitted. Data characterizing an outcome of the peer-to-peer event can be received. At least a portion of the secured funds can be transferred to an account associated with an event participant. The peer-to-peer gaming platform software executing on the client can provide a random number seed to an operating system independent random number generator so that an initial state of the skill-based digital game is consistent for the plurality of participants. The peer-to-peer competition can include the plurality of participants concurrently playing the skill-based digital game.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter can provide for an integrated platform for organizing live eSport events. Social aspects of live events can be ensured by imposing location restrictions (geographic and/or temporal) and the current subject matter can enforce those restrictions to ensure that event participants are co-located for the event. The current subject matter can provide integrated video streaming, entry fee/prize distribution handling, event advertising/promotion, and can provide gameplay in a manner that ensures fairness among players. The current subject matter can impose location restrictions so event participants will visit the venue, for example, a bar or restaurant, which can increase the venue's food and drink sales.

In addition, some example implementations of the current subject matter can provide for viewing of event participant gameplay without requiring special audio/visual equipment, connections, adaptors, and the like. The viewing may take place at a venue without interfering with existing patrons who are not participating in the event (e.g., other venue customers). The viewing may be customized for each event participant, which can increase participant engagement and enjoyment. The current subject matter can be implemented using a mobile device, such as a tablet or smart phone and which can be standalone and/or connected to a television, projector, and/or other display device.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 7-25 illustrate interfaces for event organizers to interface with event portal;

FIGS. 26-34 illustrate interfaces for players to sign up/register for an event.

Like reference symbols in the various drawings indicate like elements.

DETAILED DESCRIPTION

Figure 1:
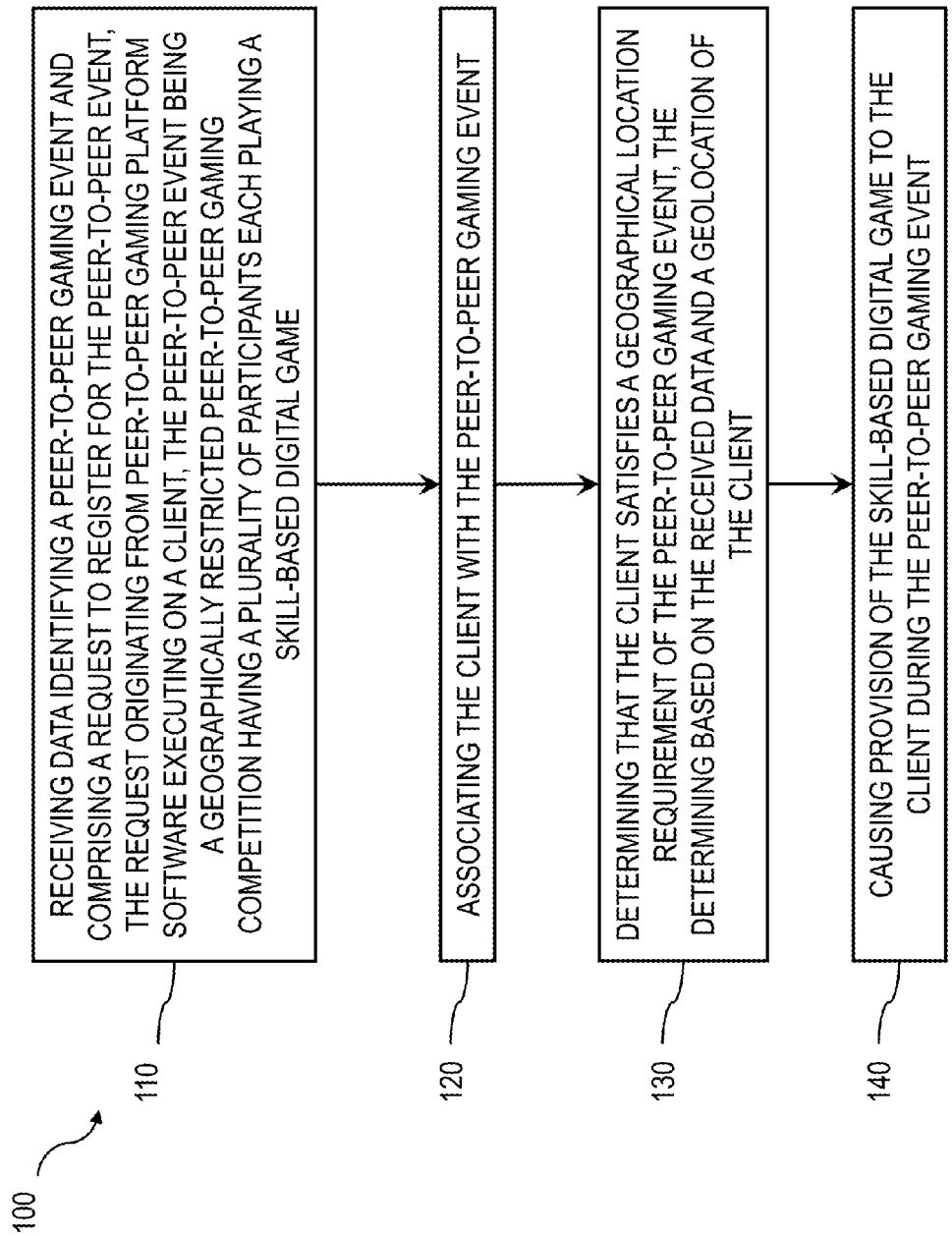
FIG. 1 is a process flow diagram illustrating a process of providing a skill-based digital game for a peer-to-peer gaming event.

FIG. 1 is a process flow diagram illustrating a process 100 of providing a skill-based digital game for a peer-to-peer gaming event. Live events may be location-based and the current subject matter can enforce those restrictions to ensure that event participants are co-located for the event thereby improving player enjoyment and engagement. The current subject matter can enable peers to organize, promote, and implement live peer-to-peer gaming events in the form of gaming competitions. Live events may be location-based, have entry fees/tickets, award prizes to winners based on competition outcome, include video streaming of gameplay (both live and replay), foster social interactions among players, increase game engagement, and/or build the gaming community.

At 110, data is received identifying a peer-to-peer gaming event. The gaming event includes a peer-to-peer gaming competition with multiple participants. The event can be for a defined location and time. For example, an event may occur at or during a specific time and at a designated location or venue. Each player or participant can play a skill-based digital game during the event. The data can include a request to register for the peer-to-peer gaming event.

In some implementations, the participants can play concurrently and in some implementations, the participants can play at any point within a predefined period (e.g., during a 2 hour window of the event). Multiple plays by one participant within an event can be possible. The game can be single-player or multi-player.

The data can be received from or originate from a peer-to-peer gaming platform software executing on a remote client. The client can include, for example, a mobile computing device of a participant (e.g., a smartphone or tablet), although in some implementations, the client can include other computing systems and/or gaming consoles. The peer-to-peer gaming platform software can interface with a game instance to provide a fully integrated set of technologies that can facilitate event formation and implementation using a third party game. For example, the peer-to-peer gaming platform software can interface and/or work in parallel with existing games to provide for event functionality.

At 120, the client can be associated with the peer-to-peer gaming event. The associating can include registering the client and/or participant with the event. In some implementations, an event organizer can, utilizing an event portal, manage event registration. The event organizer can accept and/or deny user requests to join the event. In some implementations, registration can be automatic and may be according to predefined eligibility criteria, including whether an entry fee has been secured for the participant.

At 130, it can be determined that the client satisfies a geographical location requirement of the peer-to-peer event. The determining can be based on the received data and a geolocation of the client. In some implementations, the determining that the client satisfies the geographical location requirement can include receiving data characterizing a present location of the client according to (e.g., as determined by) a geolocation system of the client. The location of the client can be compared to a predefined geolocation of the peer-to-peer event, for example, by utilizing a reverse lookup database. The geolocation system can include, for example, a global positioning system (GPS) service or a local position system (LPS) utilizing beacons (for example, wireless routers, base stations, low-power dedicated beacons, and the like). When the location requirement is enforced, participants must physically attend the event in order to participate and win prizes. Event organizers and venues can benefit from the presence of the participant, for example through food and drink sales, in addition to any funds received as entry fees and not distributed as a prize.

Moreover, physically attendance can improve social aspects of gaming and increase player engagement.

At 140, provision of the skill-based digital game to the client can be caused. The provision can be during the peer-to-peer gaming event. During gameplay, the skill-based digital game can exchange game data with a remote game server, which can also be remote from the client. Causing provision of the game can include notifying the game server and the peer-to-peer gaming platform that the participant is eligible to play the game as part of the peer-to-peer event.

Figure 2:
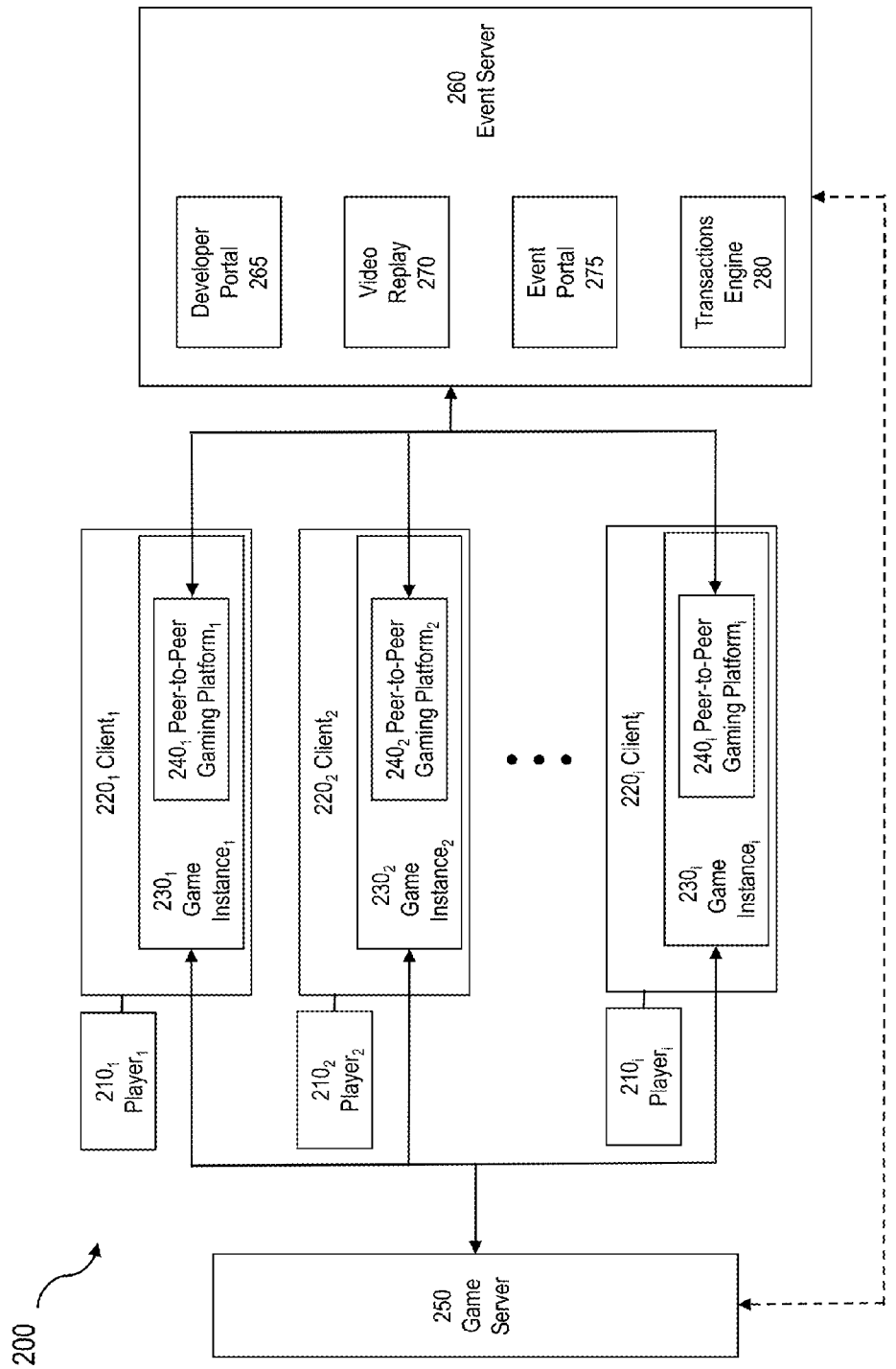
FIG. 2 is a system block diagram illustrating an example system that enables peers to organize, promote, and implement live peer-to-peer gaming events in the form of gaming competitions.

FIG. 2 is a system block diagram illustrating an example system 200 that enables peers to organize, promote, and implement live peer-to-peer gaming events in the form of gaming competitions. A plurality of players $210_i$ (i=1, 2, ..., N) can operate respective clients $220_i$. Each client $220_i$ can include a game instance $230_i$. The game instance $230_i$ can include any online digital game (e.g., video game) in which player skill is the dominate factor in determining game outcome, not chance. The multiple players $210_i$ can join a peer-to-peer event as participants and can compete against one another during the live peer-to-peer event. Games can be the same across game instances $130_i$ (e.g., if the players $210_i$ are playing chess, each game instance $230_i$ is an instance of an electronic chess game). Each game instance $130_i$ can be in communication with and receiving game data from a game server 250. The game server 250 can provide game data necessary to operate the game. Alternatively and/or in addition, game instances $230_i$ can exchange game data directly. In some implementations, only a subset of the players $210_i$ are event participants. Non-participants can be spectators and/or unaffiliated with the event. System 200 can provide a peer-to-peer gaming platform that enables peer-to-peer wagering on non-event gaming tournaments to the players $210_i$ who are not participating in the event.

Each game instance $230_i$ can include peer-to-peer gaming platform software $240_i$ executing on the respective client $220_i$. The peer-to-peer gaming platform software $240_i$ can integrate into the game instance $230_i$ and enables participant $210_i$ to register for and participate in a live event. The peer-to-peer gaming platform software $240_i$ communicates with and works in tandem with an event server 260. In some implementations, the peer-to-peer gaming platform software $240_i$ can provide for peer-to-peer wagering on non-event gaming tournaments.

Event server 260 can include modules to facilitate organization, promotion, and implementation of live peer-to-peer gaming events. Event server 260 can include developer portal 265, video replay engine 270, event portal 275, and transaction engine 280.

Developer portal 265 can include self-service integrations portal to configure software development kit (SDK) software component modules connected to event server 160 that enable multiplayer features including peer-to-peer wagering within existing single-player game software. Developer portal 265 allows configuring of the interactions between clients $220_i$ and event server 260. A game developer, game publisher, and/or host of game server 250 may utilize developer portal 265, for example. A game publisher may interact with developer portal 265 via peer-to-peer gaming platform software $240_i$ or a web browser interface 285. A game publisher can include users of the system 200 who intend to integrate their games with the platform.

Through web browser interface 285, game publishers are able to download software components, be guided through the process of integrating the software components into their games, manage their games on the system, view statistics and other information about their game's player population, modify tournaments set up through the platform, and perform other configuration and setup tasks.

Video replay engine 270 can provide for video capture and streaming of game play during an event. Video recordings can be streamed live and stored for all game entries which can later be verified for authenticity (e.g., anti-cheating) and also reviewed live by an event host for entertainment, information, and to increase engagement of players. Video replay engine 270 can facilitate capture of video of activity in a software interface display space on client $220_i$ (e.g., such as capturing a display of game $230_i$); enable processing, streaming, and storing of the captured video; and support retrieval, usage, and sharing of video content. For example, during an event, screen shots of a graphical user interface and any images displayed therein can be captured at an appropriate rate and streamed to video replay 270. Video capture can be performed by, for example, capturing user-interface display space views through screenshots at a predetermined rate or frames per second. Another example can include capturing open graphics library (openGL) layers. Yet another example can include capturing data in a pixel buffer and forming video data from the captured data. Other implementations are possible.

The video capture can include metadata related to the video capture such as time of capture, identification of the event, user identification, software identification, location based data, user input, hardware identification, and the like. Video replay 270 can store and archive the received user-activity video signals and serve as a repository of previously received or currently received video streams. All video streams created during an event can be associated together.

In some implementation, event system 200 can generate a video feed recording in-game actions during an event. The peer-to-peer gaming platform $240_i$ can capture an interface display space of the skill-based digital game $230_i$ or of client $220_i$ and transmit the capture as a video stream to video replay 270. Video replay 270 can broadcast the captured video to additional peer-to-peer gaming platforms $240_i$ of other participants in the event. In this manner, an audience (e.g., other participants) can view a participant's game play without requiring existing audio/video equipment in a venue.

In some implementations, generating the video feed can include simultaneously broadcasting video captures of multiple participants' gameplay. The video captures can be broadcast side-by-side allowing viewers of the video feed to compare in-game actions (e.g., gameplay and performance) across event participants. A participant, after completing game play (or a portion of the game, such as a level), can view his or her own gameplay side-by-side with that of an opponent. In some implementations, a participant can view their gameplay side-by-side with the event's current first place game. Thus, the second video stream (or the client) can be selected based on a ranking of performance of the second client in the peer-to-peer gaming competition.

In some implementations, an event host can control aspects of the live video feed, such as controlling which feeds are broadcast at any given time. Live replay 270 allows an event host to act as a type of video master of ceremonies (MC) or broadcaster/announcer during the event.

Event portal 275 can provide for organization, management, and promotion of peer-to-peer events. A live event can contain one or more live tournaments. A live tournament can include a time-boxed tournament in which multiple participants pay an entry fee for a chance of winning cash and/or other prizes. Entry fees can be held in escrow using transactions engine 280. Each participant may or may not be allowed multiple entries into the competition (e.g., multiple game-plays). Each participant can play the same game as every other participant, and for each entry. The starting game state can be the same for all entries and all participants, for example, by having the peer-to-peer gaming platform $240_i$ provide a seed to an operating system independent number generator. In some implementations, a stream of random numbers can be provided from event server 260. Game instances $230_i$, which often have elements of randomness, can start in a consistent state across all participants. Multiple entries can be permitted per participant. Multiple prizes and prize tiers are possible.

Placement within a live tournament can be determined by a modular set of placement-defining rules. This can include paradigms such as best score, in which the player's individual entry that achieved the best score out of all of that player's entries is used to rank participants when determining prizes. Another example of a scoring paradigm is "recent score," in which a player's score on their most recent entry is used to rank participants. Other paradigms are possible, including, for example, counting a player's second best score when determining rank.

Events can be location-based so that the event will take place at a specific geographical location, and systems are in place to only permit users who are at those geographical locations to participate in the event. In addition, events and/or live tournaments can be protected by a passcode (e.g., an "entry code") that only allows participants with the passcode to enter the event and/or tournament.

Figure 3:
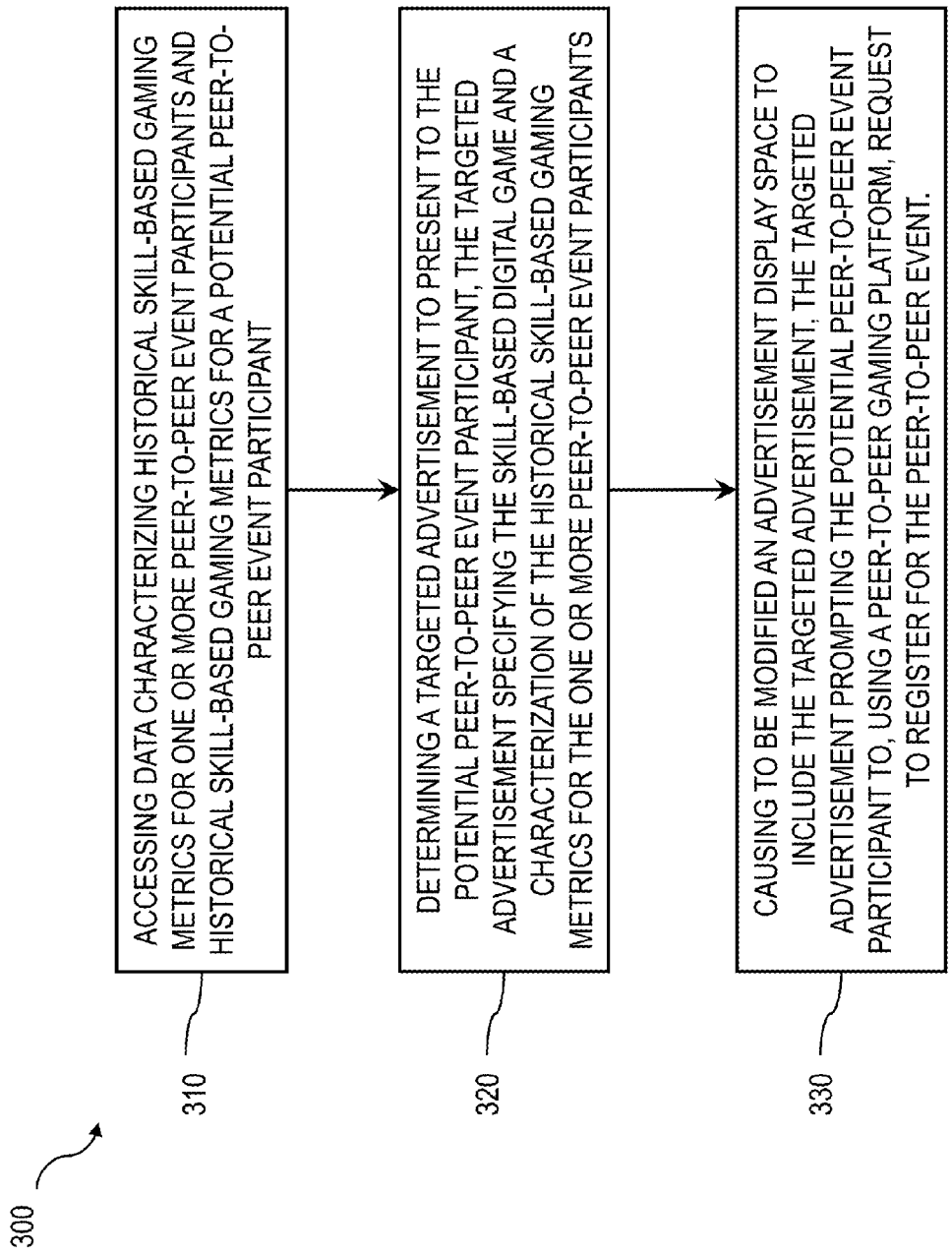
FIG. 3 is a process flow diagram of a process of providing a targeted advertisement to a potential peer-to-peer event participant.

In addition, event portal 275 can enable event promotion. Push notifications can be sent to participants and eligible potential participants alerting them as to their placement in tournaments or to the availability of current and upcoming tournaments. Event portal 275 can create targeted advertisements. For example, FIG. 3 is a process flow diagram of a process 300 of providing a targeted advertisement to a potential peer-to-peer event participant. At 310, data can be accessed characterizing historical skill-based gaming metrics for one or more peer-to-peer event participants. The accessed data can also characterize historical skill-based gaming metrics for a potential peer-to-peer event participant. Historical skills-based gaming metrics can include game attributes that can be traced (e.g., recorded or monitored) and are associated with the player's in-progress, most recent, and/or past game plays. For example, historical skills-based gaming data can include: an in-game score, game outcome, time to complete a stage, game level achieved, difficulty, number of enemies, power-ups acquired, player ratings, number of wins or losses, statistical measures of attributes (e.g., average scores, ratio of wins to losses, etc.), top scores across some or all players, completion of any game related task, objective, and/or achievement, in-game acquisition of items, and/or other character attributes. Historical skills-based gaming metrics can include other traceable game attributes.

At 320, a targeted advertisement to present to the potential peer-to-peer event participant can be determined. The targeted advertisement can specify the skill-based digital game and a characterization of the historical skill-based gaming metrics for the event participant. The content of the targeted advertisement can be based on configurable messaging rules (i.e., a set of rules). The rules can be used to target potential event participants with specific geographical locations, attributes, levels of skill, or relationships. For example, in addition to being geographically close to an event, an advertisement or invitation could prompt to a player to join the event based on a player exceeding a certain predetermined value or score for a particular in-game challenge. The rules can include whether the player has completed a particular level, game, number of games played, time played, or other game element. An advertisement could be presented when a player is among a certain percentile of players (e.g., prompting players to enroll in an event with like-skilled players).

Additional rule examples can include when a potential event participant has wagered, lost, and/or won at least a certain amount (e.g., prompting players to enroll in an event that requires "high stakes" or large minimum entry fee), when one or more associated event participants (e.g., links on a social networking website) are enrolled in an event (e.g., prompting a potential event participant to register for an event with their friends), when a potential event participant has played a certain number of games, and/or when a potential event participant has completed a level or challenge in another event or tournament. The messaging rules can also be based on a geographic location of the potential event participant, or whether the potential event participant is eligible to wager cash or rewards on a tournament (e.g., which may be based, for example, on their age). Administrators, and/or event organizers can configure and/or customize the messaging rules.

At 330, an advertisement display space can be caused to be modified to include the targeted advertisement. The targeted advertisement can prompt the potential peer-to-peer event participant to, using a peer-to-peer gaming platform $240_i$, request to register for the peer-to-peer event.

The targeted advertisement can include graphical, textual, and hyperlink information necessary to populate pre-existing advertising space with a customized invitation for potential event participants to register for an event. Targeted advertisements can include customized messages derived or based on the messaging rules and/or other data triggered by a rule, gameplay, or historical skills-based gameplay metrics. The targeted advertisement can be targeted to the potential event participant and include a characterization of the potential event participant's historical skills-based gaming metrics and a characterization of one or more existing event participant's historical skills-based gaming metrics. For example, the targeted advertisement can include information regarding how many of the player's friends, contacts, or in-network users are registered for the event. The advertisement content can show how a potential event participant would fare if they joined an event by including a comparison between or characterization of the historical gaming data and other players that have registered for the event (e.g., showing how much money the player would have won in an event, a comparison of the potential event participant's average score to other registered participants' average scores, a mock leader board where the potential event participant is compared to all registered event participants, and the like). The targeted advertisement can include the entry fee.

Referring again to FIG. 2, the event server 260 and/or event portal 270 can also pass data characterizing advertisements (e.g., advertising logic, invitations, and/or messages) to the game server 250.

From a user perspective, the event portal 275 can be used to set up, configure, administer, and host live events via the system 200. The event portal 275 can interact with and coordinate other modules (e.g., developer portal 265, video replay 270, and transactions engine 280) to facilitate the administration of live events.

Event portal 275 can provide for viewing events (active, upcoming, completed); viewing individual event details; creating new events (including setting event details, event name, start/end time with dates, locations, entry codes, description, and the like); which games to play at the event; adding tournaments (including setting tournament name, prize type, entry code, withdrawal code, number of players, duration, entry fees, prize/payout structures, scoring paradigms, and the like); testing the event (including entering system usernames for testers; time boxed testing in which entries are free, and the like); submitting for approval (e.g., submit an event for administrator approval); going live (e.g., making an event live in system 200); hosting a live updated leaderboard (the leaderboard can include usernames, avatars, scores, timestamps and a now playing indicator); providing live video streams (including playback of recent replays such a "instant replay," playback of live streams of gameplay, metadata such as scores, and the like); analytics (including number of participants, number of entries, fees collected, prizes paid out, administrative fee, profit calculations, and the like).

The peer-to-peer gaming events can be location-based (e.g., the event will take place at a specific geographical location). The location requirement can be specified by an event organizer or host using the event portal 275 and can be enforced by the system 200. For example, event hosts are able to specify locations for their events. Multiple disparate locations are possible.

Figure 4:
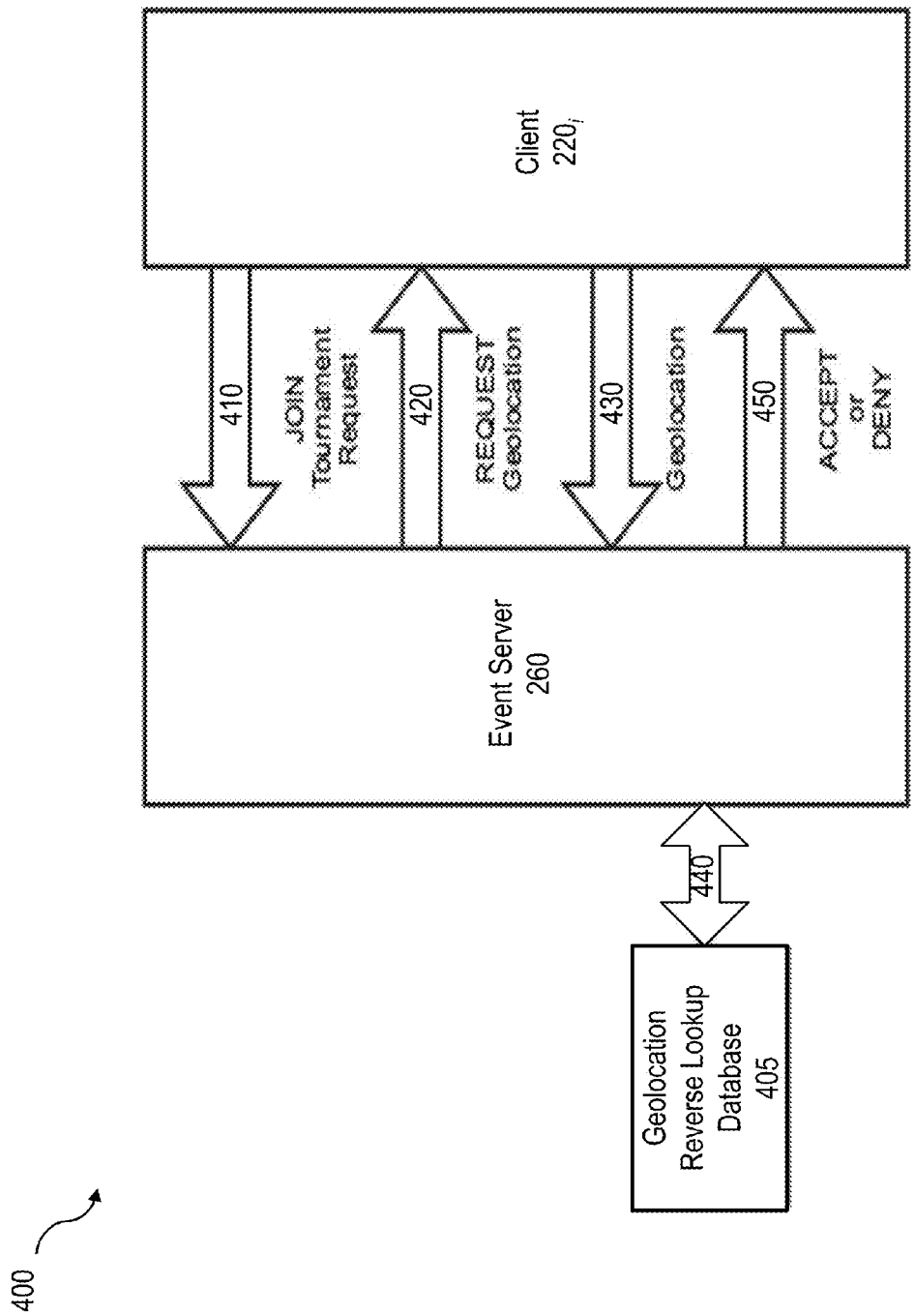
FIG. 4 is a data flow block diagram illustrating enforcement of geolocation requirements.

FIG. 4 is a data flow block diagram 400 illustrating enforcement of geolocation requirements. At 410, client sends a JOIN TOURNAMENT request to event sever 260. Event server 260 checks with an event definition for a geographical requirement. The geographical requirement can be predefined, for example, by an event host. The event server 260 sends a GEOLOCATION REQUEST to client $210_i$ at 420. Client $210_i$, uses built-in geolocation systems (e.g., geolocation systems/devices utilizing GPS, wireless wide area network (WWAN), and WIFI technologies) to determine the client's location. The location is sent to the event server 260 at 430. At 440, event server 260 verifies location based on reverse geolocation lookup table/database 405 or similar services. At 450, event server ACCEPTS or DENYS the JOIN TOURNAMENT request.

Figure 5:
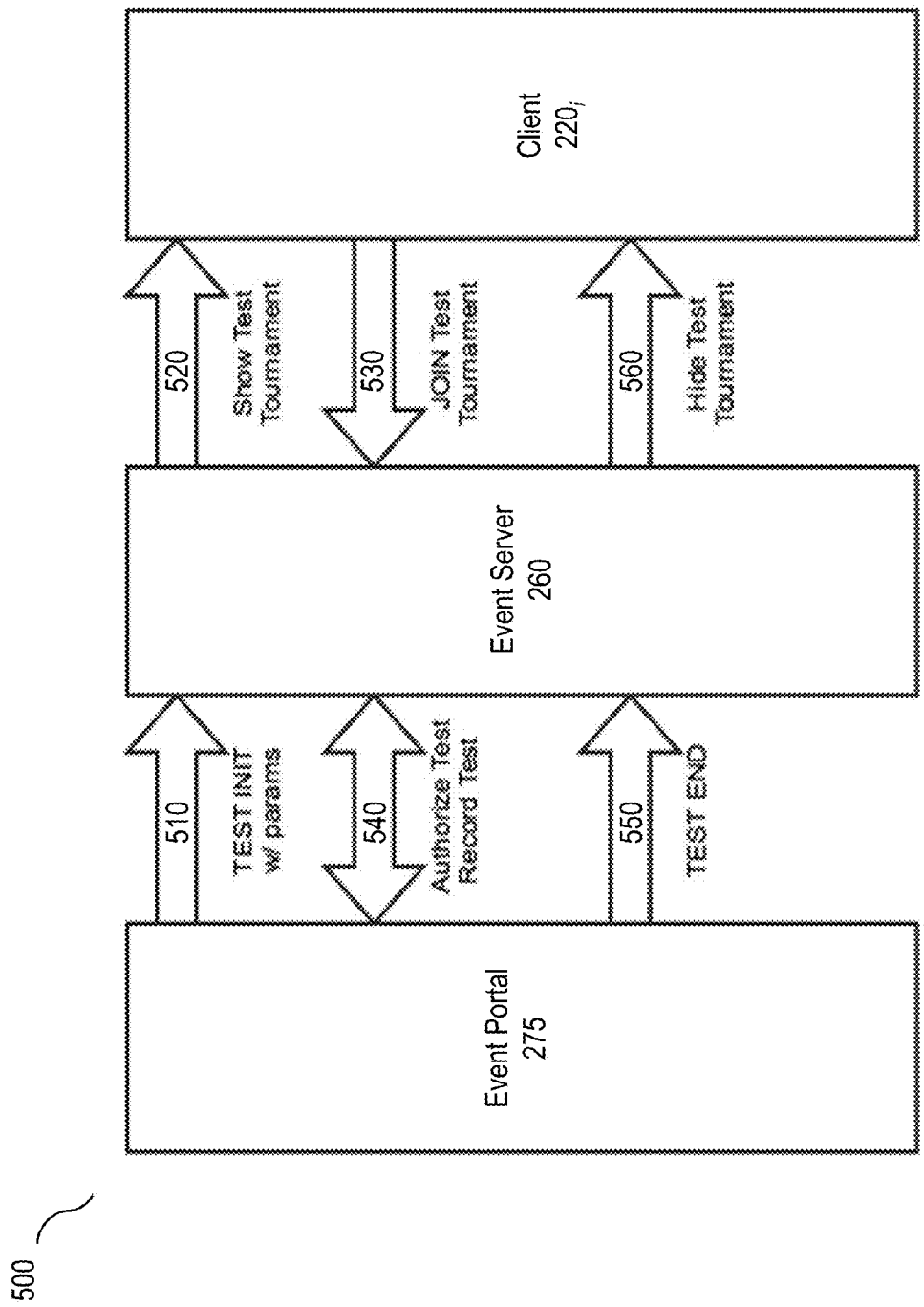
FIG. 5 is a data flow diagram illustrating testing procedures.

Events portal 270 can provide a facility by which event hosts can test their live event setups in a live production environment prior to the start of the actual event. This testing can be performed via the event host entering a whitelist of production user accounts on the event portal 270. These accounts are given special access to a 'mock' tournament, with no entry fees required, that emulates the parameters of the real tournament. For example, FIG. 5 is a data flow diagram illustrating a data flow diagram 500 for testing procedures. The user can initiate a test via Event Portal 275. At 510, Event Portal 275 contacts Event Server 260 with an instruction to initialize the test with user-specified parameters, such as game, game type, and a list of users to permit to utilize the test. At 520, Event Server 260 tells the client $220_i$ that it should present a test tournament to the user. When the user who is testing goes to join the test tournament at 530, the client $220_i$ contacts the Event Server 260 with a JOIN request, which is authorized by Event Server 260 authorizing, at 540, with Event Portal 275. This authorization allows the testing user to play the tournament. When the test has concluded (for example, after a predetermined timeout), at 550, Event Portal 275 instructs Event Server 260, which informs Client $220_i$ at 560 to no longer show the test tournament to the user.

Referring again to FIG. 2, event server 260 can include transactions engine 280. Transactions engine 280 can maintain account information for each player or participant $210_i$, including financial information, and can act as a trusted party to hold funds in escrow and/or secure funds to enforce the terms of event entry, including an entry fee (i.e., ensures winning players receive the winnings). Players $210_i$ can register and fund accounts either directly with the transactions engine 280 (for example, accessing the server via a web browser) or through the peer-to-peer gaming platform $240_i$. The players $210_i$ can fund their account through several means, such as, for example: PayPal, credit cards, Automated Clearing House (ACH) transfer, cash, loyalty cards, pre-paid cards, coupons, system credit, credit earned by watching advertisements, Google checkout, etc. Other methods of funding the account are possible.

In an example implementation, when each player $110_i$ registers for an event, each player $110_i$ can pay an event entry fee for one or more gaming competitions. The transactions engine 280 can secure the player $210_i$ funds. Secured funds cannot be withdrawn or used for another wager. Securing the funds can include transferring the funds from the player account to an escrow account as well as placing a "hold" on the funds in the player's account. Once the transactions engine 280 secures funds from all participating players $210_i$, the event can proceed.

In some implementations, funds are not secured until a player $210_i$ requests to enter a specific gaming competition in an event having one or more competitions or tournaments. In some peer-to-peer events, players $210_i$ can enter in or play a gaming competition more than once and pay an entry fee for each entry and at time of entry. Other implementations and variations are possible.

Figure 6:
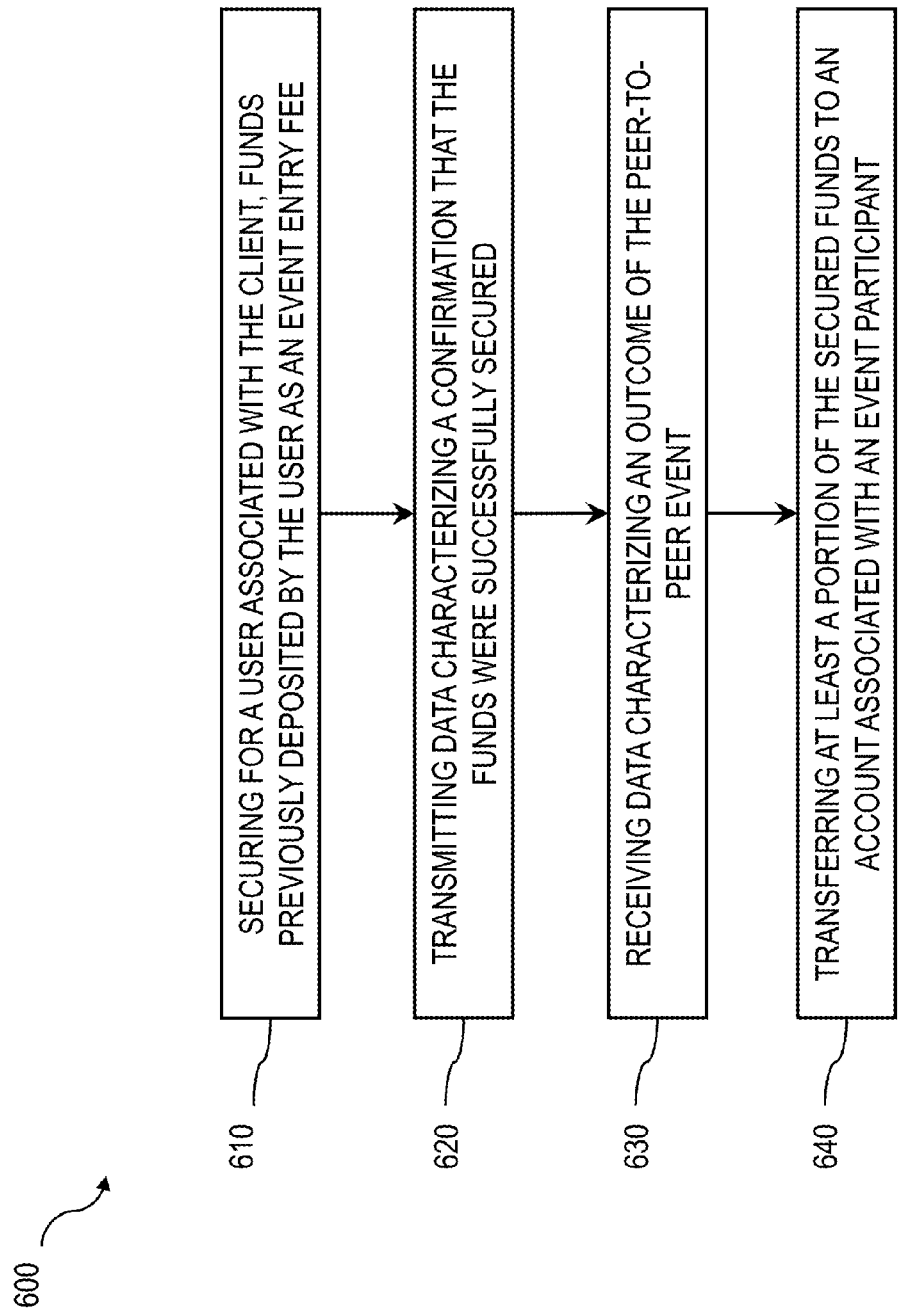
FIG. 6 is a process flow diagram illustrating an example process for securing player funds for entry into a peer-to-peer event and/or gaming competition.

FIG. 6 is a process flow diagram illustrating an example process 600 for securing player funds for registering for or for entry into a peer-to-peer event and/or gaming competition. At 610, funds previously deposited by a user can be secured as an event entry fee. The user can be associated with the client. At 620, data characterizing a confirmation that the funds were successfully secured can be transmitted. At 630, data characterizing an outcome of the peer-to-peer event can be received. At 640, at least a portion of the secured funds can be transferred to an account associated with an event participant.

FIGS. 7-39 illustrate user interfaces for various example implementations of the current subject matter. FIGS. 7-25 illustrate interfaces for event organizers to interface with event portal 270. FIGS. 26-34 illustrate interfaces for players $210_i$ to sign up/register for an event. FIGS. 35-39 illustrate interfaces for display on clients $220_i$ before, during, and after live peer-to-peer events.

Figure 7:
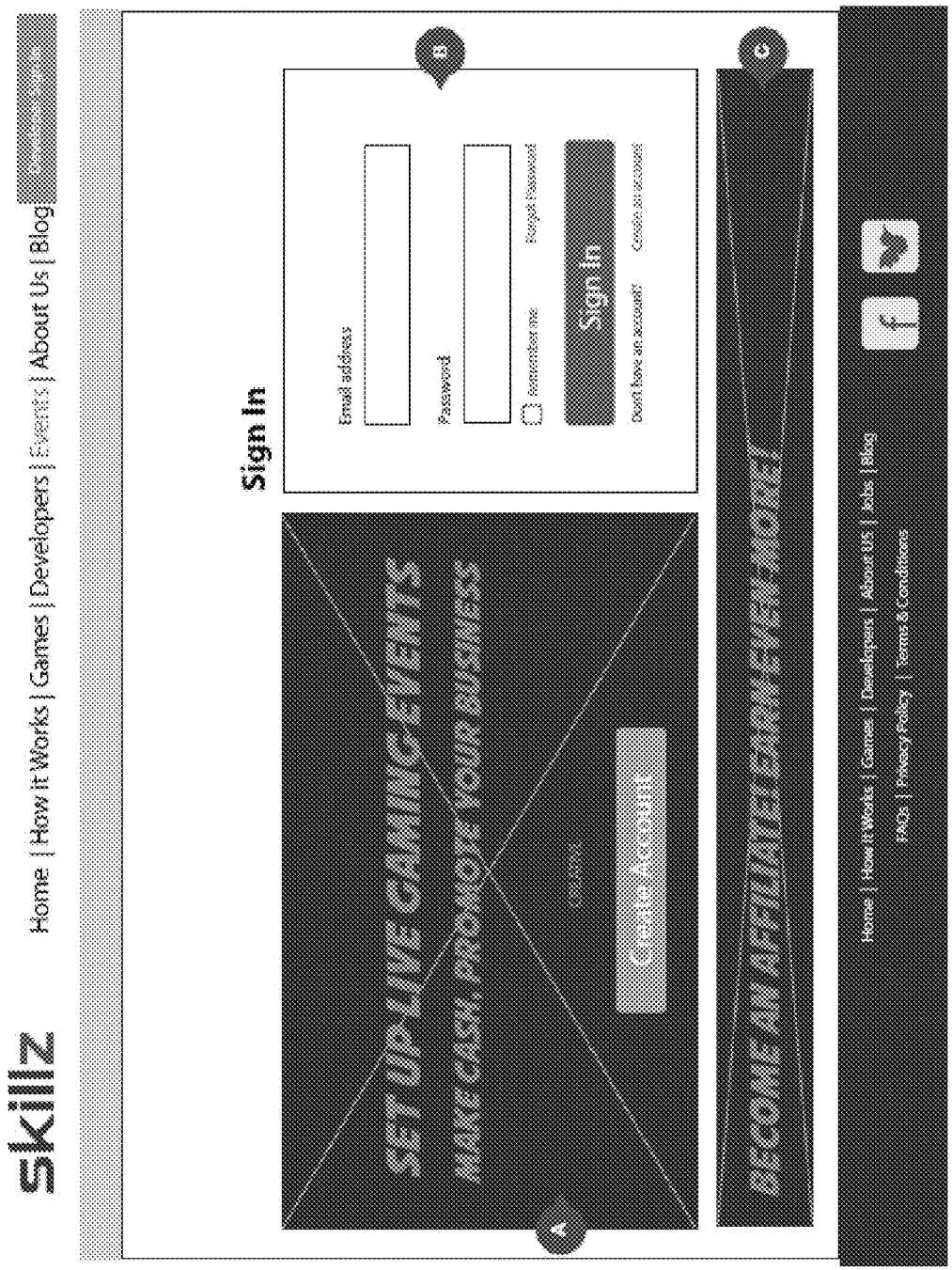
Figure 8:
Figure 9:
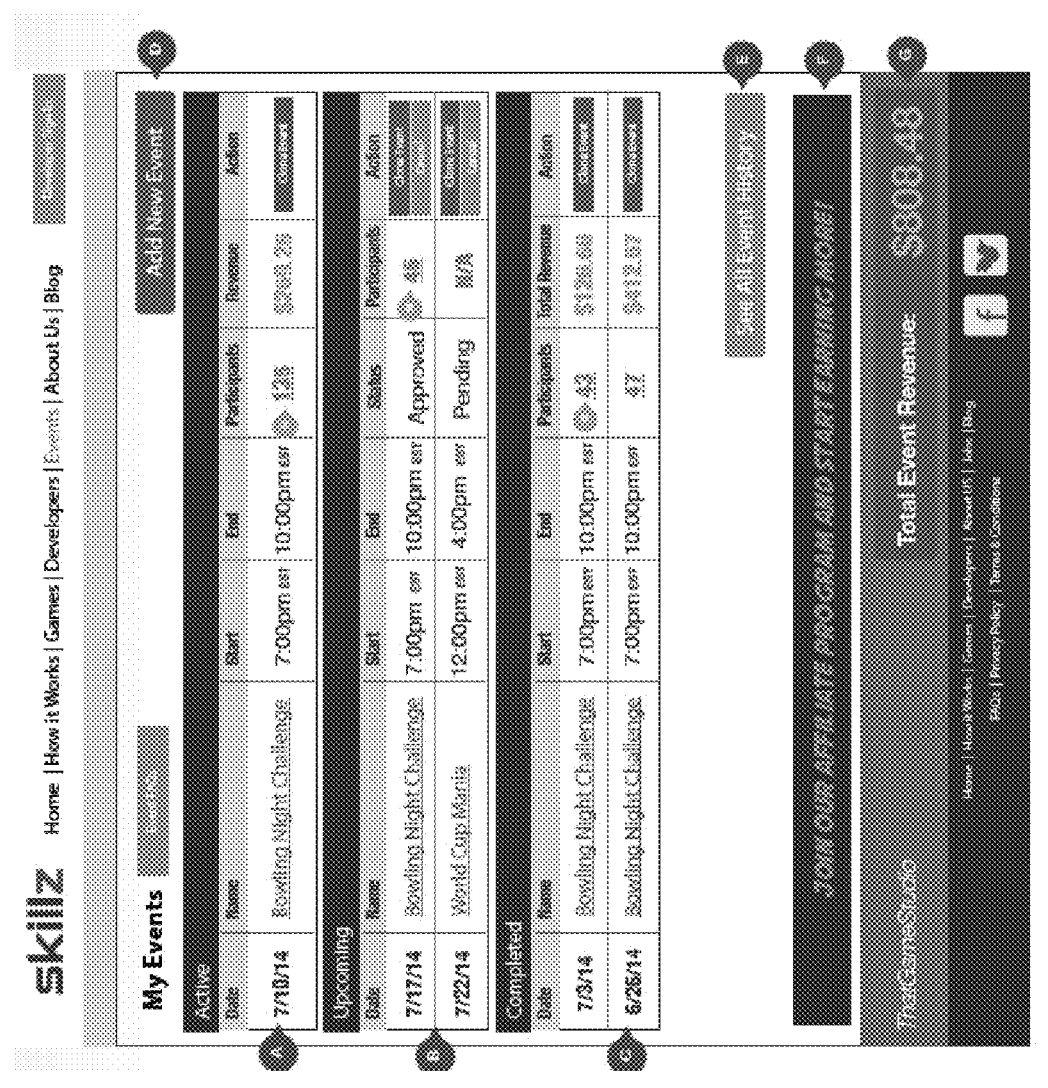
Figure 10:
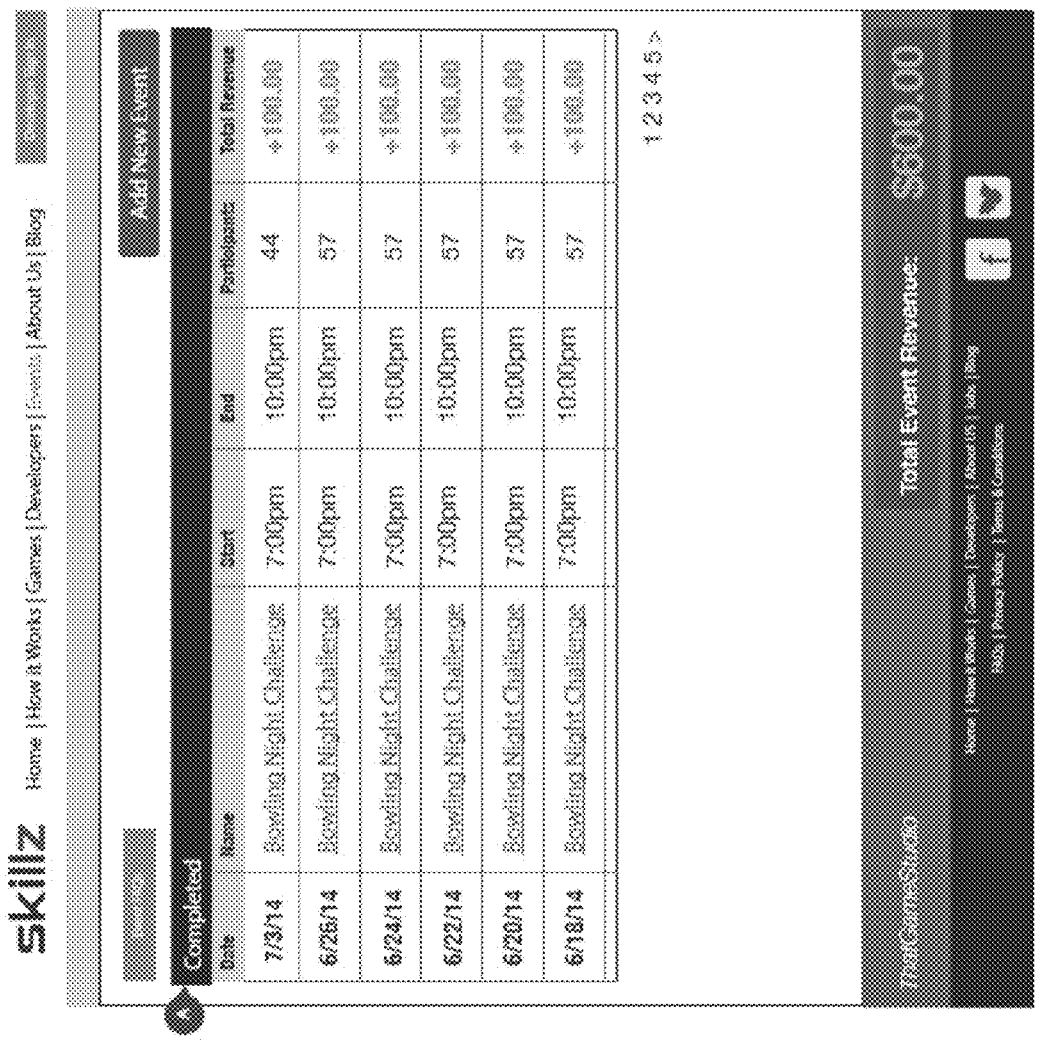

FIG. 7 illustrates an example event portal login. A banner can be displayed for creating an account, an existing user login prompt can be provided, and a call to action for an affiliate use, for example, advertisement. FIG. 8 illustrates an example event portal sign up interface having a form entry for signing up and an existing user sign-in link. FIG. 9 illustrates an example event portal dashboard. Events that are live appear near the top of the page, events that have been created but are not live yet are displayed sorted by date and this section need not appear if there are no upcoming events that are approved or pending approval. For events with pre-registration, live events, or completed events, the number of users who have signed up or participated can be displayed. Completed events can also be displayed along with the revenue produced for the organizer by the event. Event history, advertisements, and total event revenues can be displayed. FIG. 10 illustrates another example event portal dashboard displaying many completed events.

Figure 11:
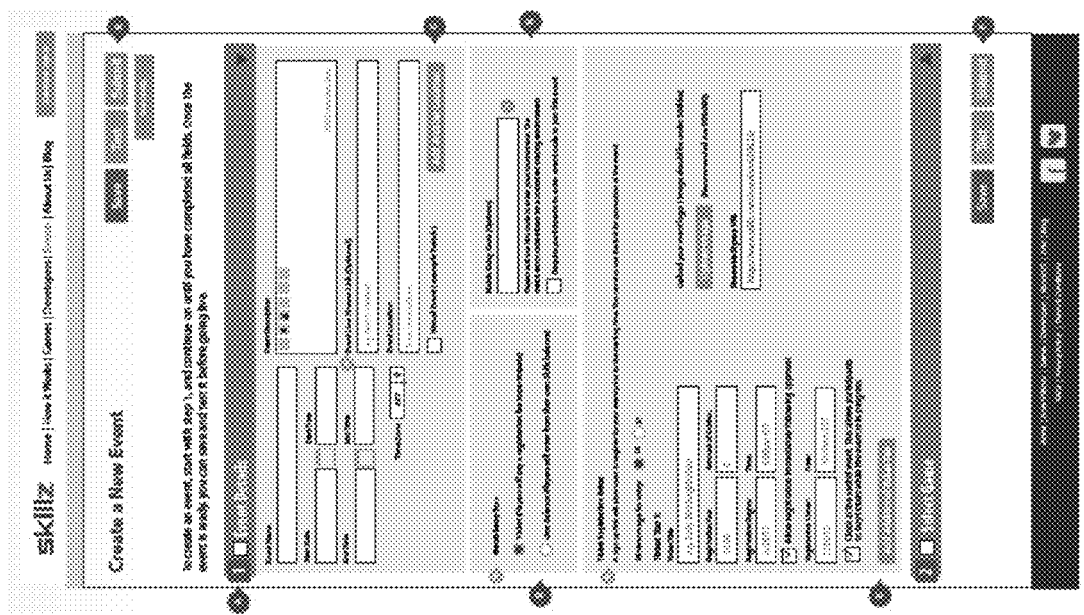
Figure 12:
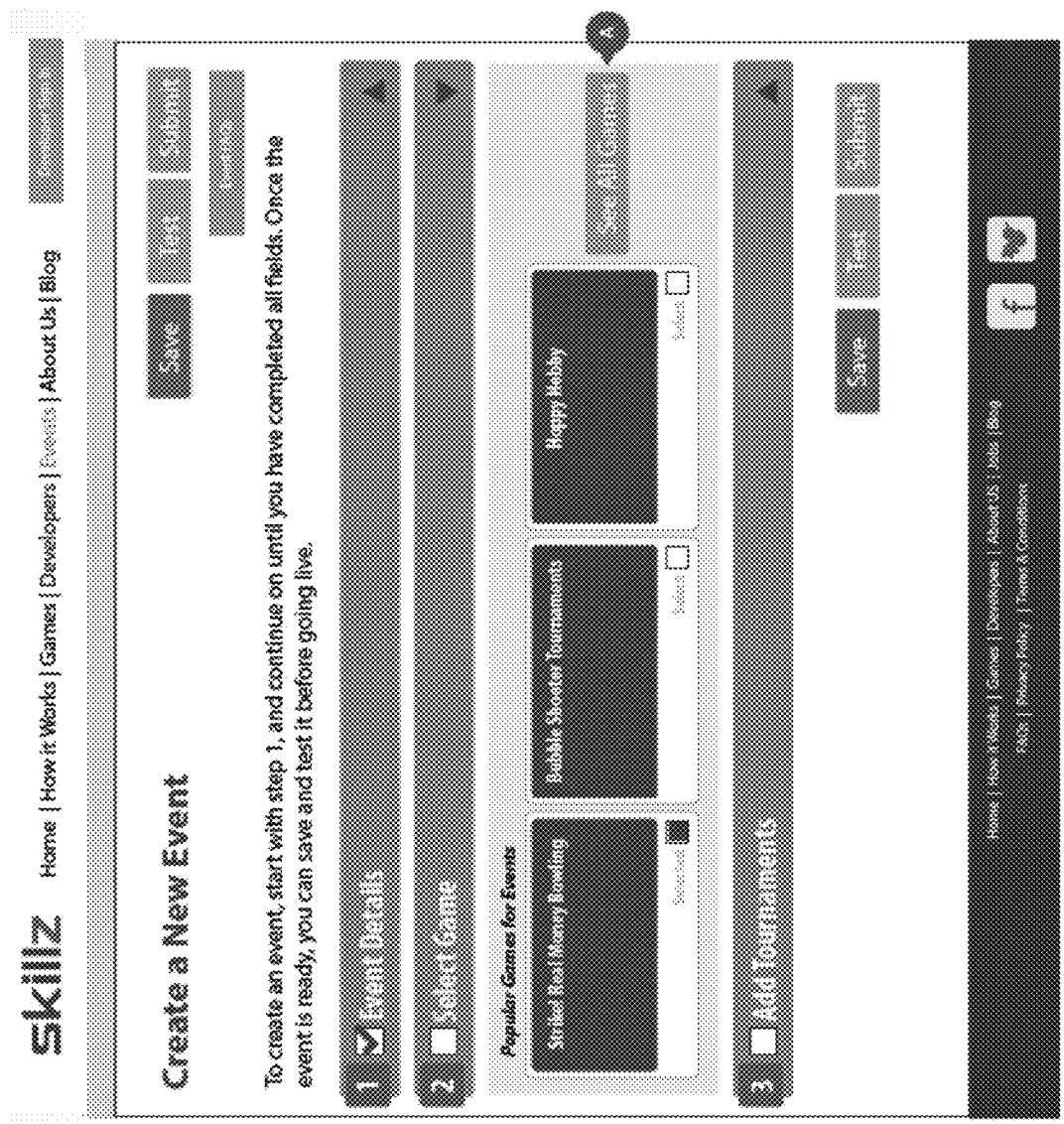
Figure 13:
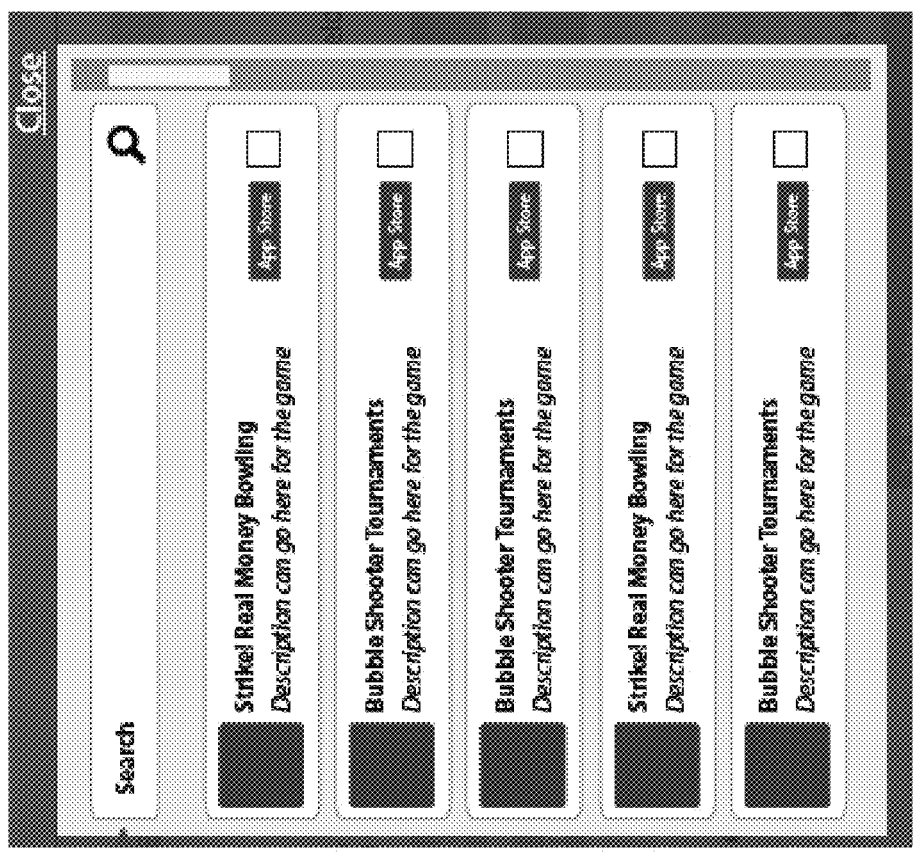
Figure 14:
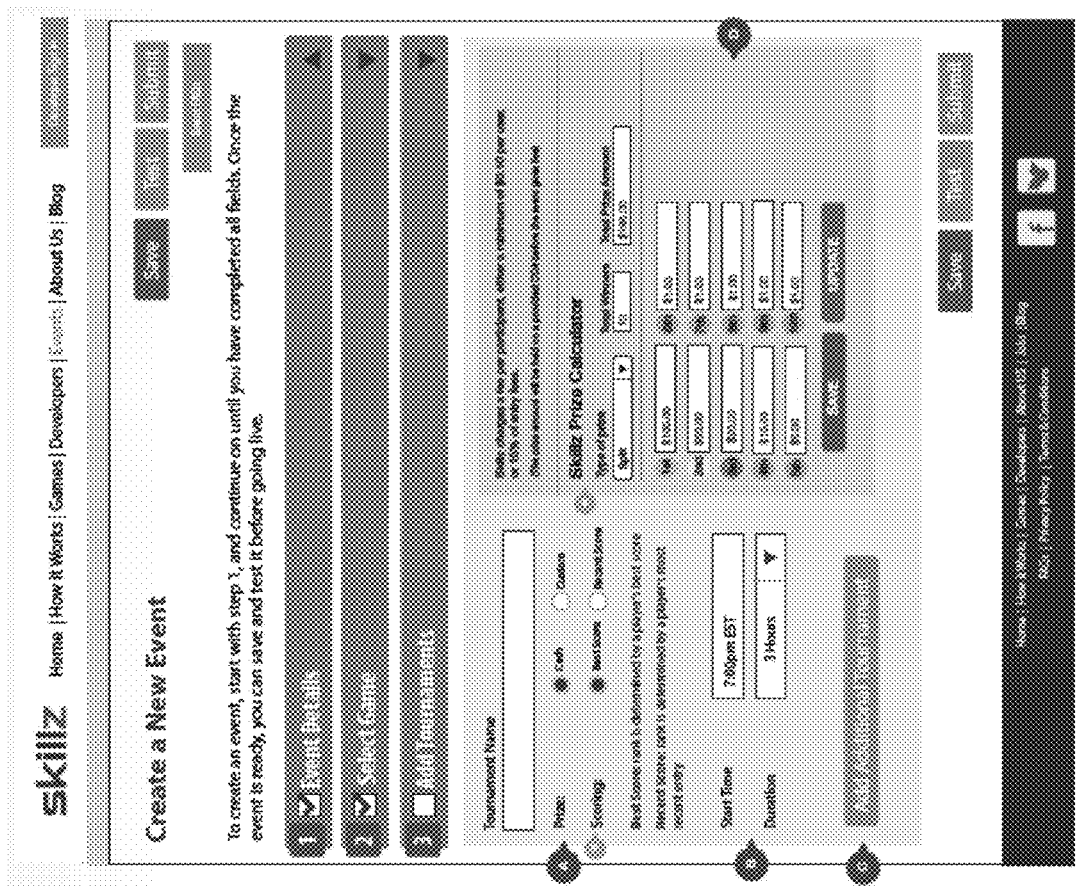
Figure 15:
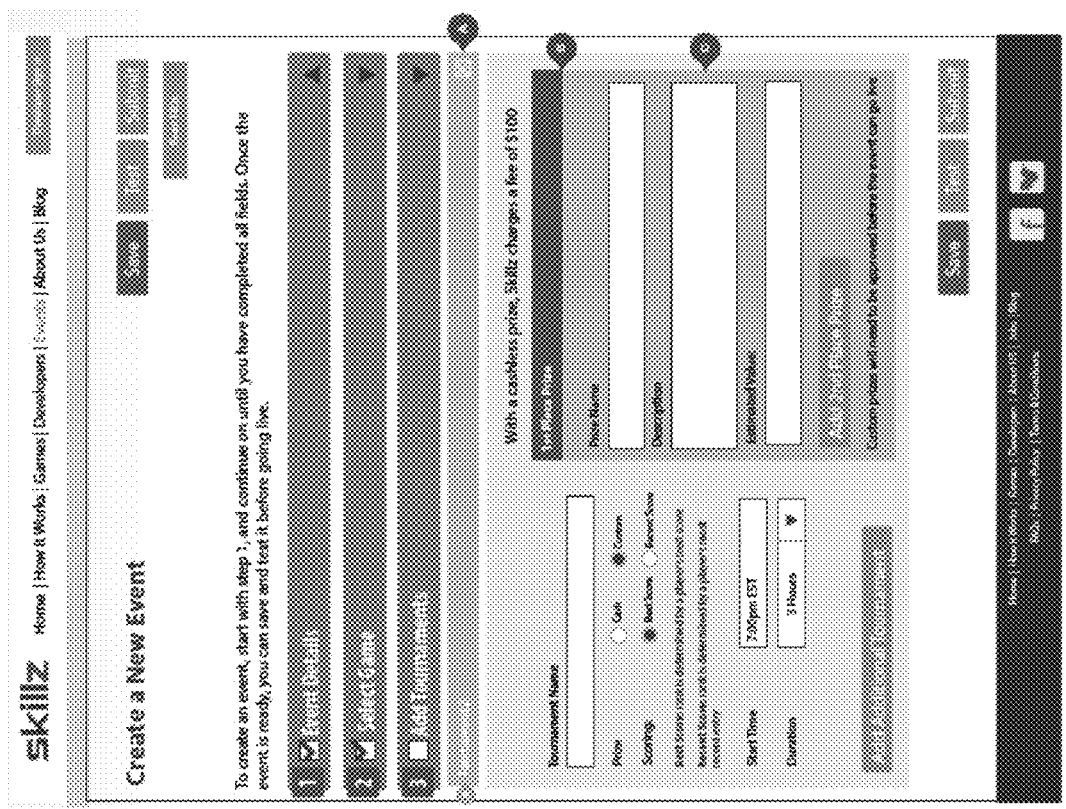
Figure 16:
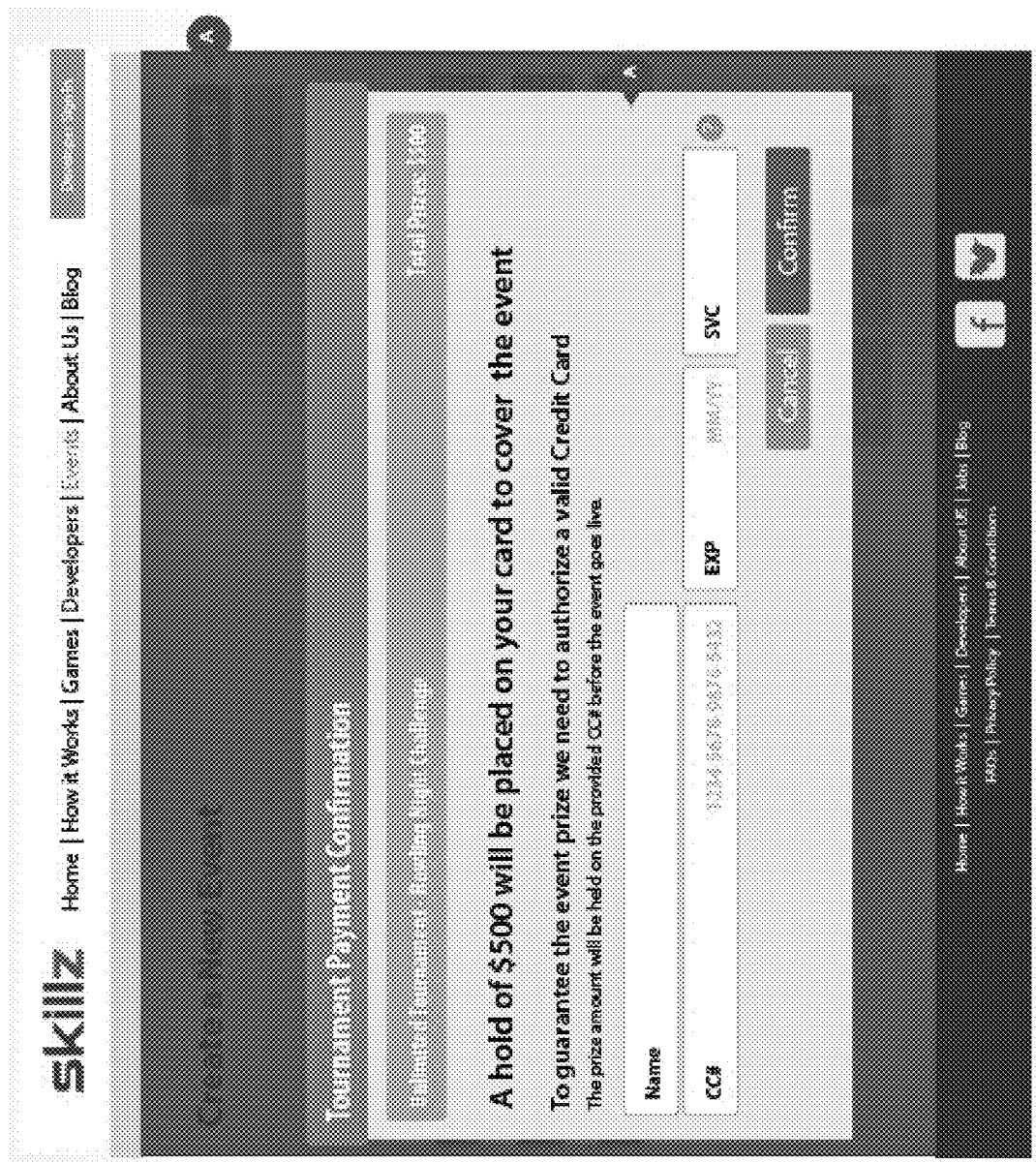
Figure 17:
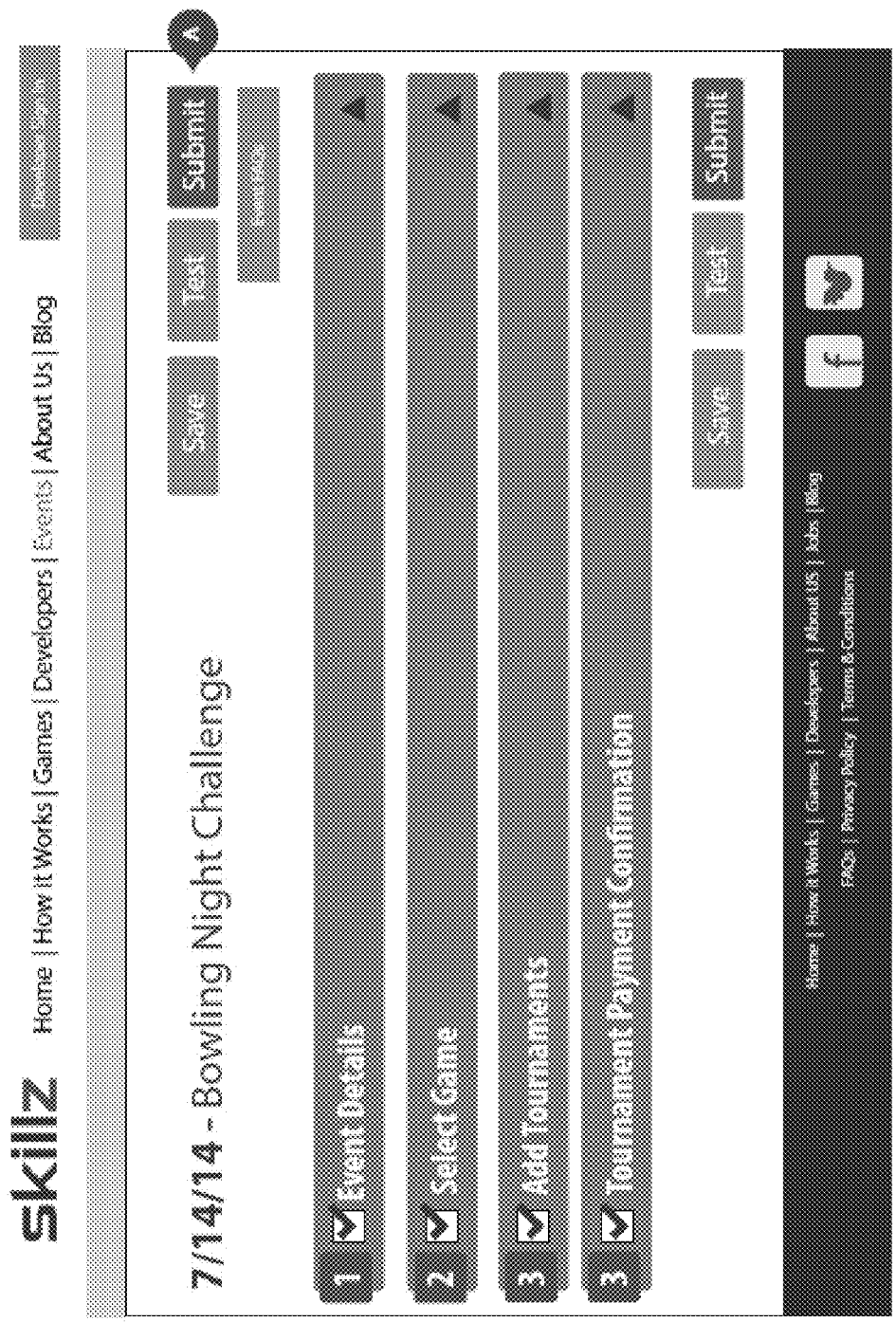

FIG. 11 illustrates an interface for creating (e.g., organizing) a new event. A match entry code can be specified, as well as geographic location, entry type (which can determine whether an event will offer pre-registration or normal open play. Additional tickets can be offered for both pre-registration, and users who wish to buy-in again to the live event. FIG. 12 illustrates an interface for selecting a game during the event creation/organization process. FIG. 13 illustrates an interface for searching for specific game titles and results shown. FIG. 14 illustrates an interface for adding tournaments or gaming competitions to the event. Scoring type can be toggled between best score and recent score, start and end time can be specified, additional new tournaments can be added to the event, and prize and entry fee can be specified. Prizes can be split among multiple participants. FIG. 15 illustrates an interface for adding another tournament or gaming competition to the peer-to-peer live event. FIG. 16 illustrates an interface for confirming tournament payment. In some implementations, the event organizer can guarantee event prizes prior to hosting the event. FIG. 17 illustrates an interface once the organized event is ready to be saved.

Figure 18:
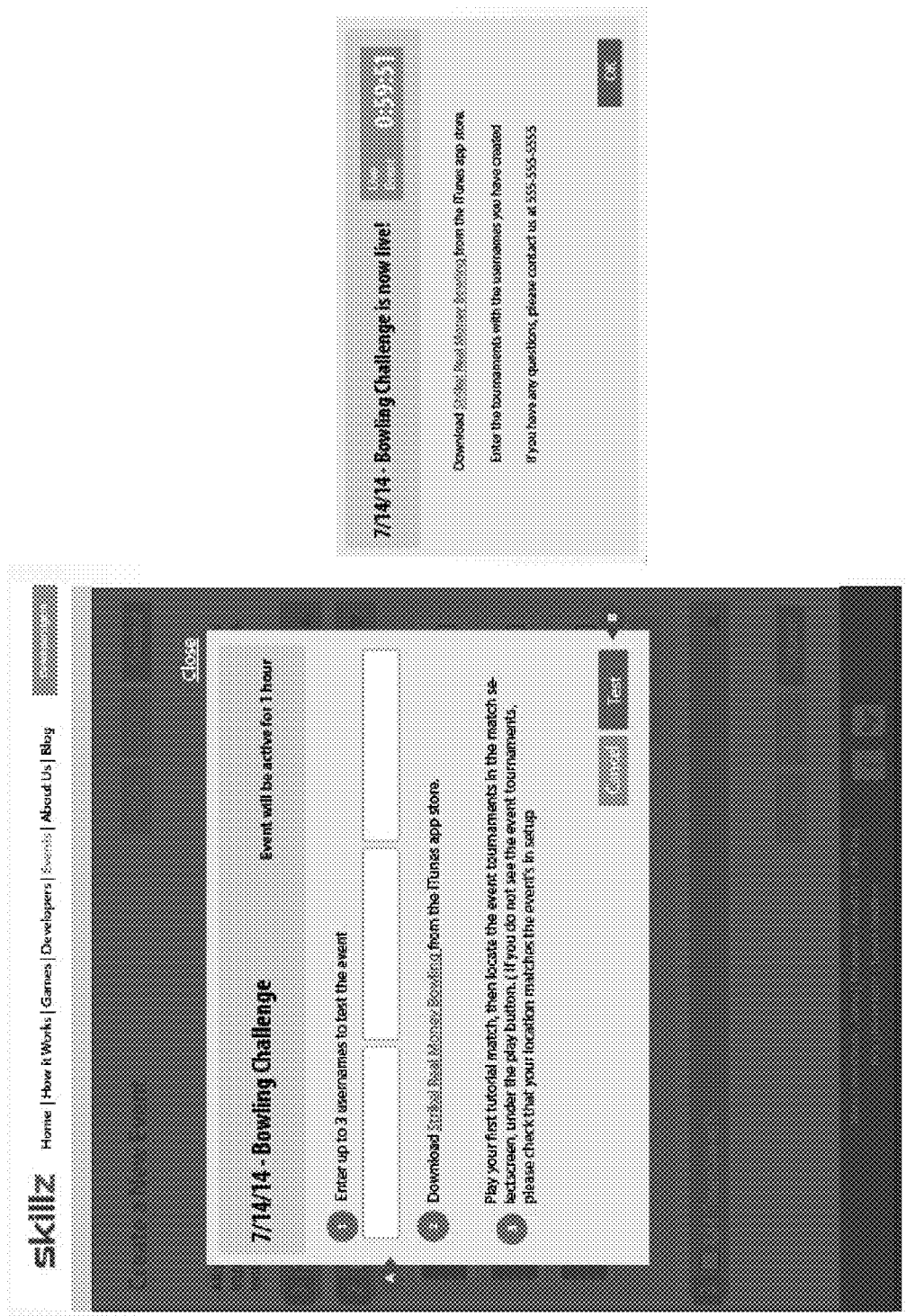

FIG. 18 illustrates an interface for testing an organized event and an interface for displaying a confirmation screen during test that the event is live. The interfaces provide instructions to the organizer.

Figure 19:
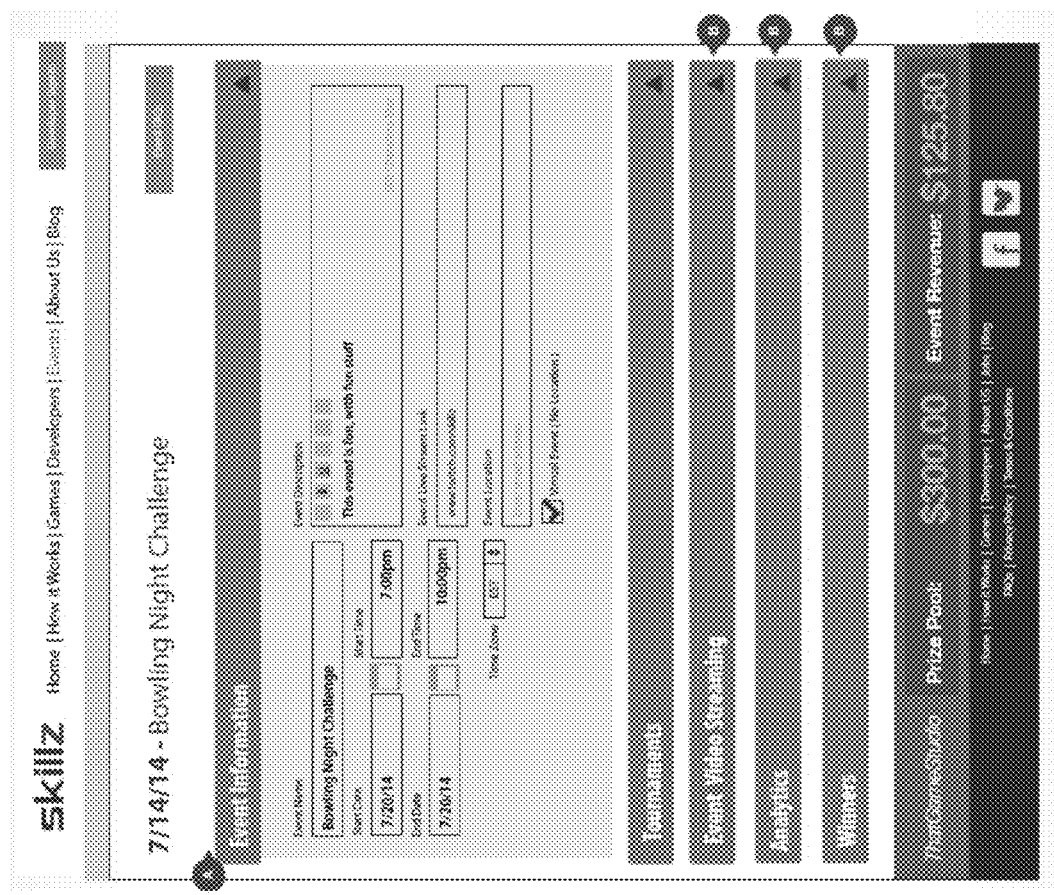
Figure 20:
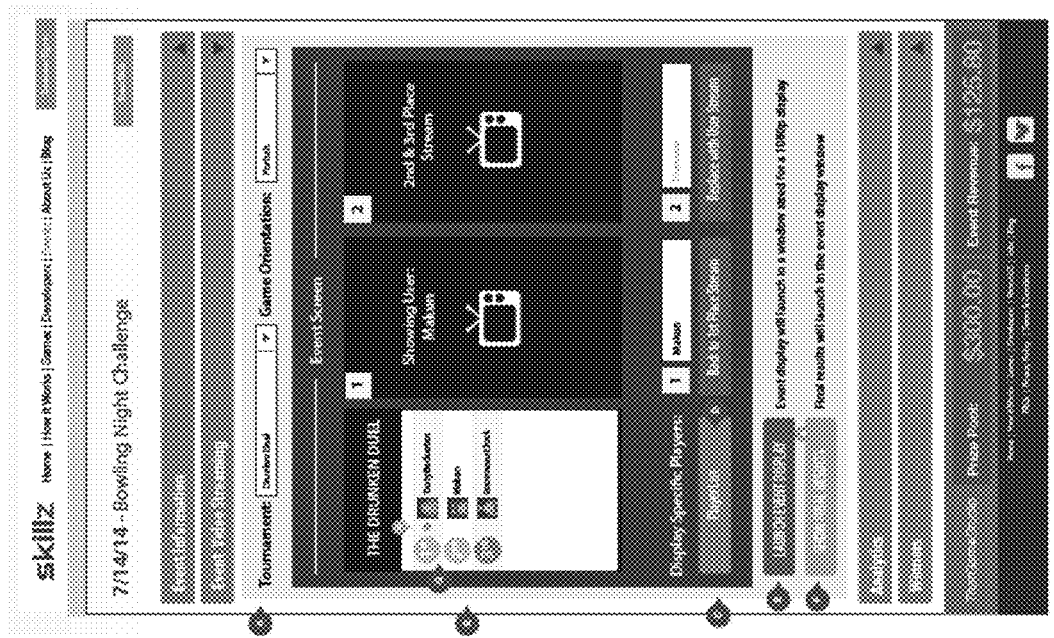

FIG. 19 illustrates an interface for the organizer to review event information. Event information cannot be edited once the event has gone live. Event video streaming, analytics, and winners (including withdrawals) are not displayed until the event is actually live. FIG. 20 illustrates an interface for configuring video streaming. The video streaming can be configured during a live event by the organizers. Three content areas can be specified for display in a combined view. In FIG. 20, display 1 illustrates the first place user's replay, while display 2 shows both $2^{nd}$ and $3^{rd}$ place user replays. These displays can be replaced with specific users using interface controls. A specific user can be displayed.

Figure 21:
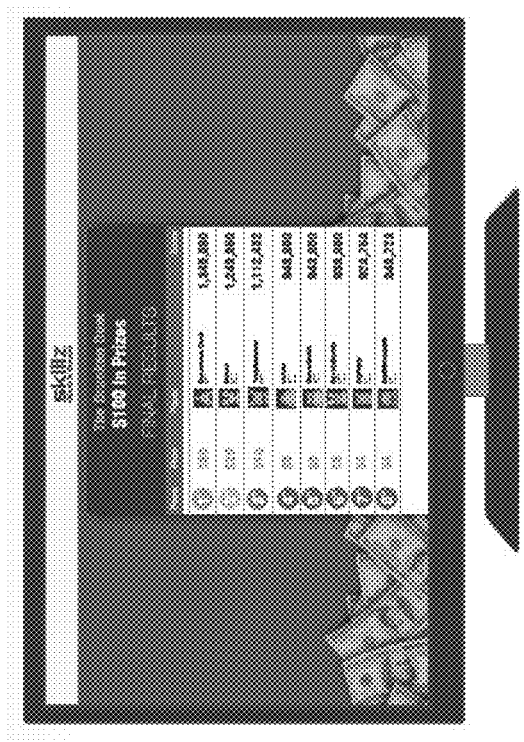
Figure 21:
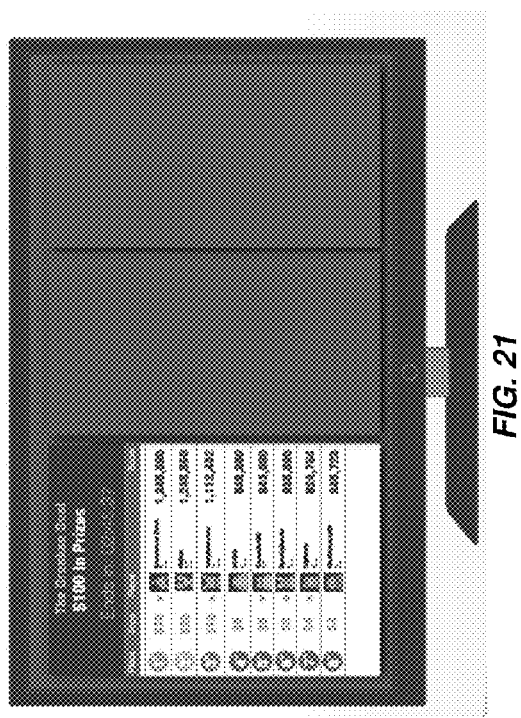
Figure 22:
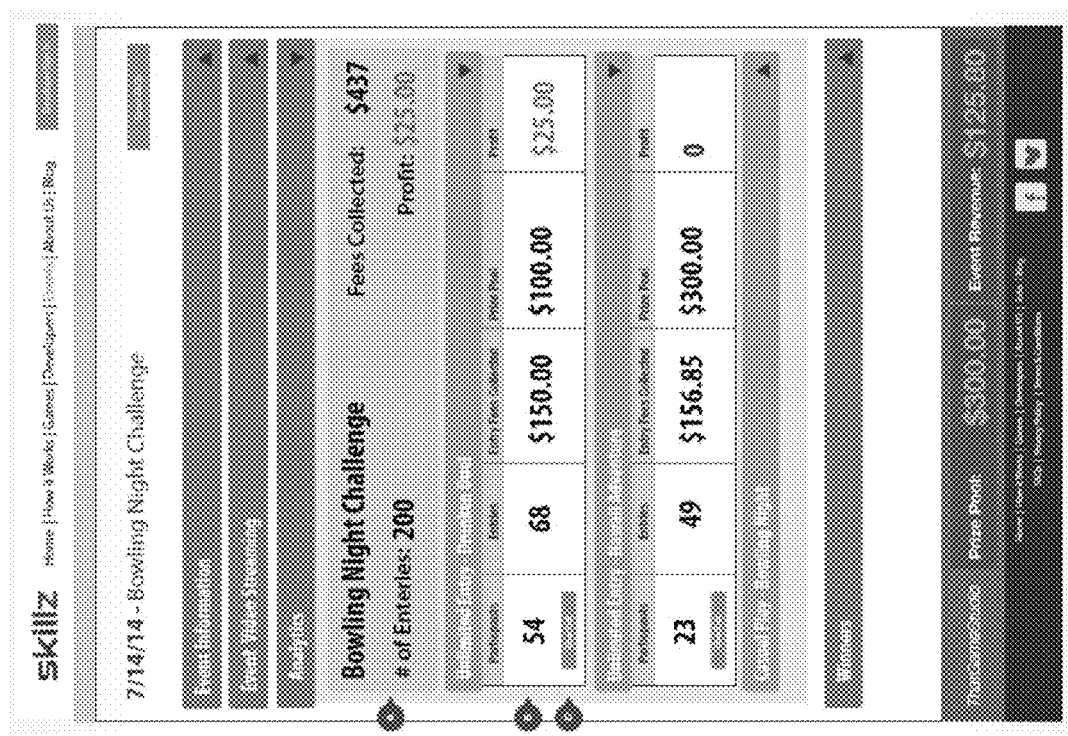

FIG. 21 illustrates an interface for streaming event videos. At top are example results of the event while at bottom is a live leader board (e.g., for display during the event). The leader board can be displayed alongside or concurrent with the video streams. FIG. 22 illustrates an interface for displaying event analytics (either during the event or once the event has completed).

Figure 23:
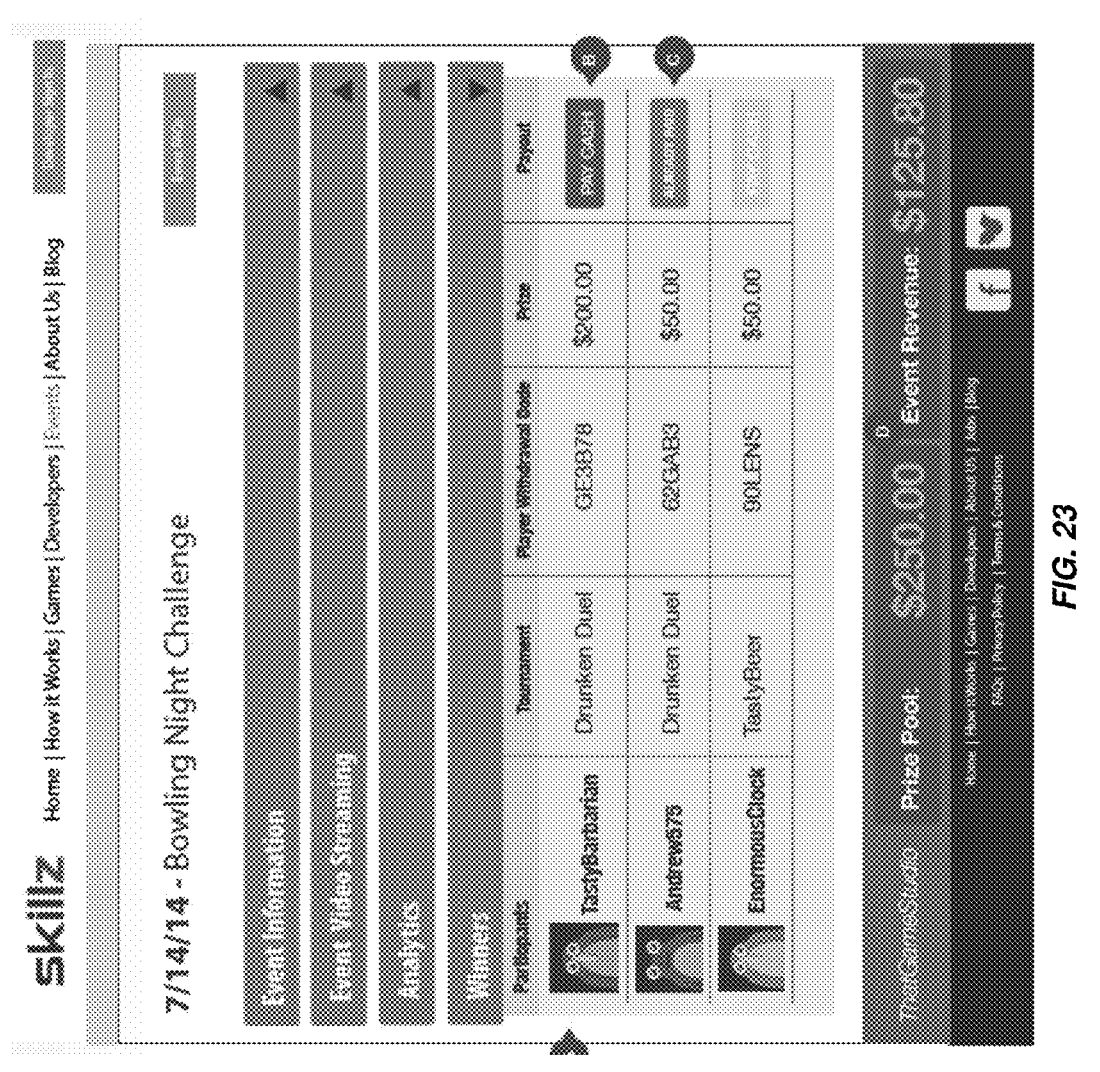
Figure 24:
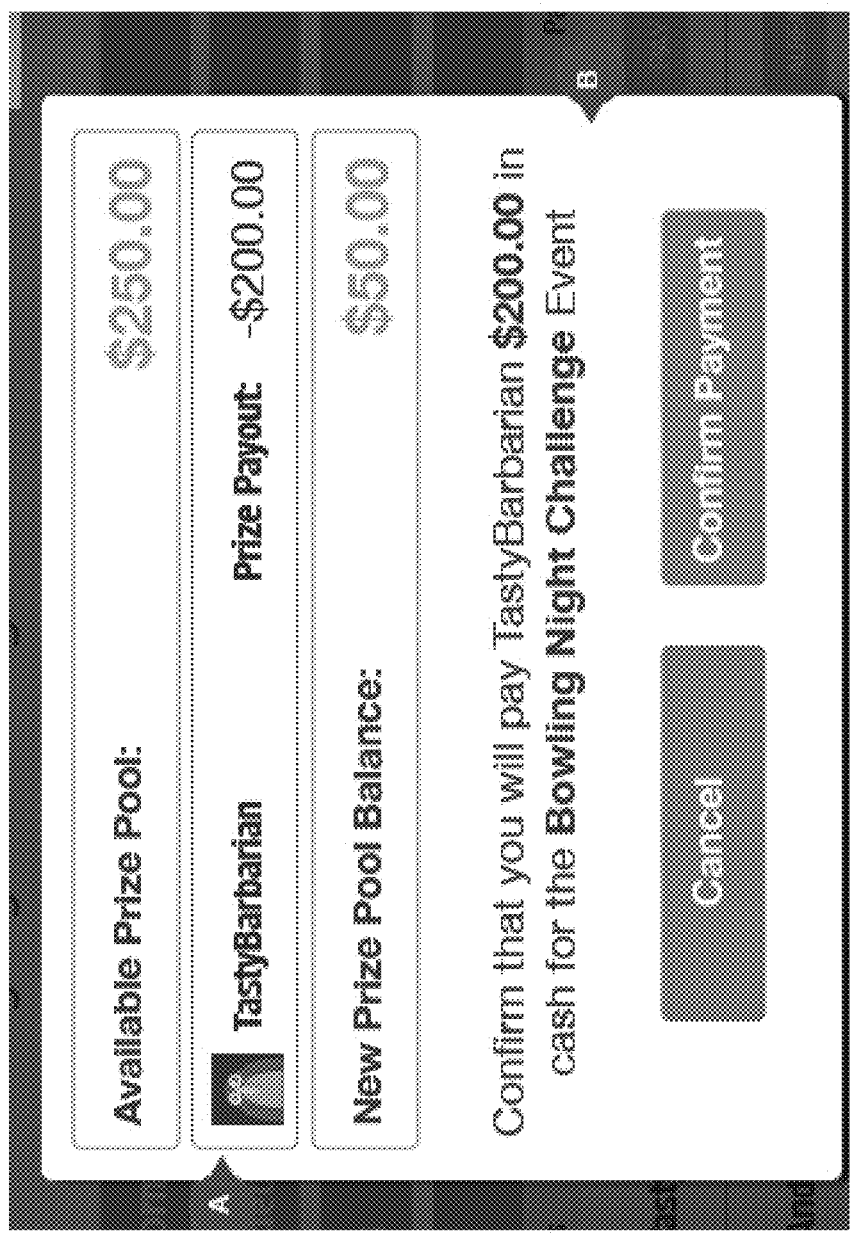

FIG. 23 illustrates an interface for displaying and enabling the event organizer or host to distribute event prizes. A unique withdrawal code can be provided for each player that has won a price. The user can enter this code using the peer-to-peer gaming platform $240_i$ to confirm payment. When an event host clicks "pay cash" the amount paid out will be reflected on their profits and the amount charged on their card if the withdrawal code is not entered or one is not available, there is no action to pay the user cash. When a player has been paid cash, it is so labeled and becomes inactive. When a user has been paid, the prize pool will update to reflect the remaining balance to be paid out. In some implementations, the user flow can be performed according to: 1) player tells the host their username; 2) host tells the player their specific withdrawal code; 3) player enters the code and submits the withdrawal; 4) pay cash button becomes active; and 5) host clicks pay cash button. FIG. 24 illustrates an interface for displaying winner payout. When an organizer pays a player in the event, this confirmation screen can appear. The amount of available prize money is displayed at the top. This amount can change each time a player claims a prize. If there is a zero dollar available prize pool, all available prizes have been paid out for the event.

Figure 25:
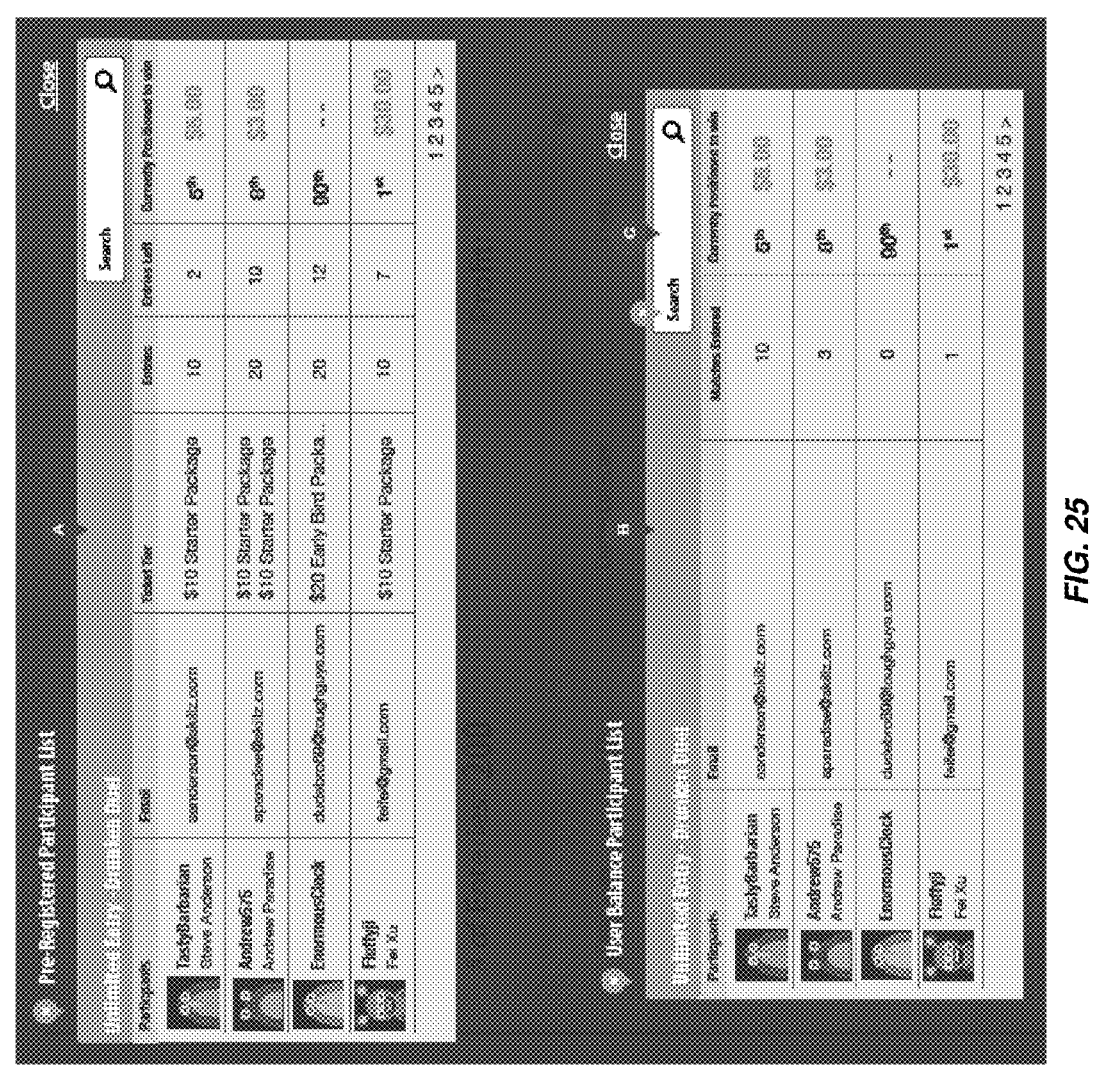

FIG. 25 illustrates an interface for displaying pre-registered and registered users during a live event. This participation list can be for an open, user balance live event. A user can be searched for within the participant list.

Figure 26:
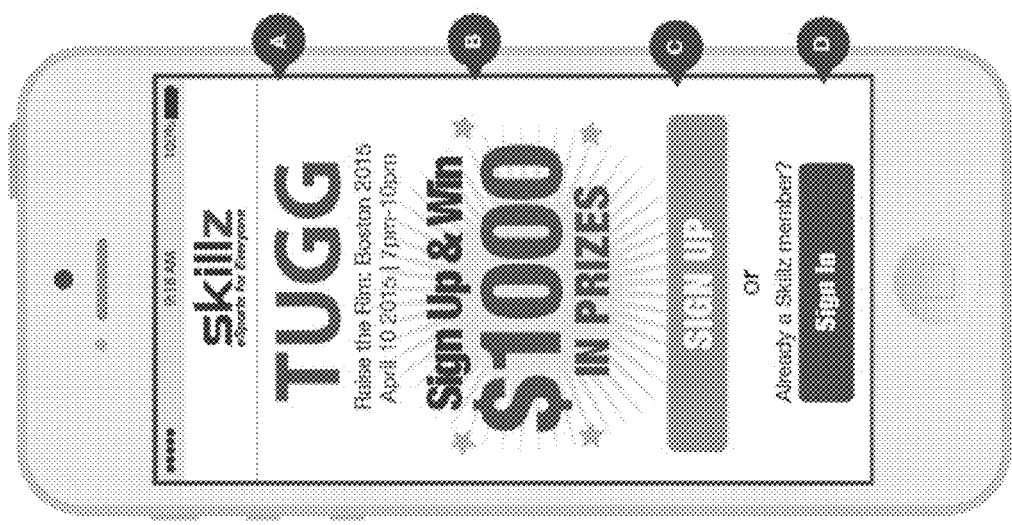
Figure 27:
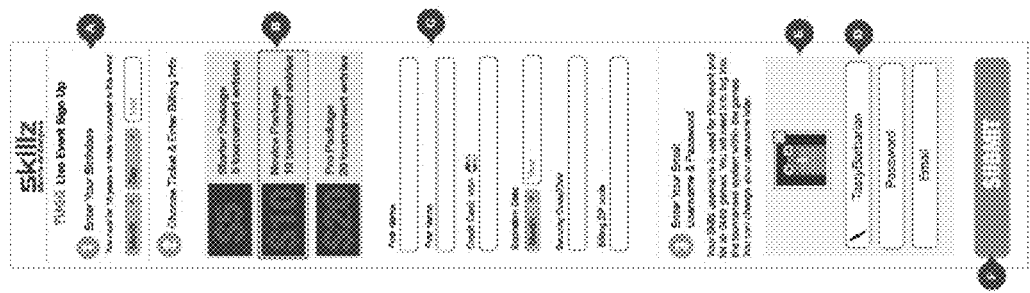
Figure 28:
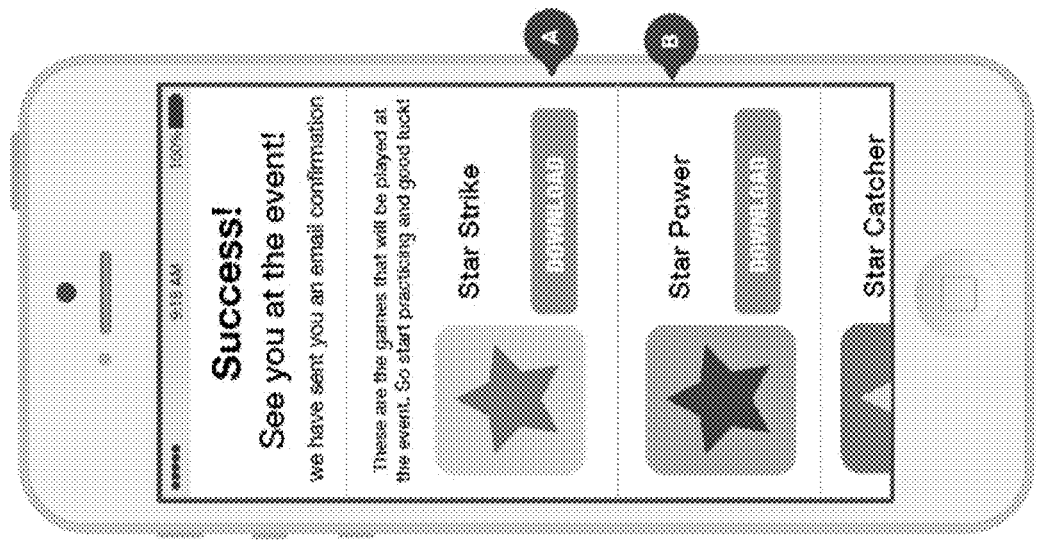
Figure 29:
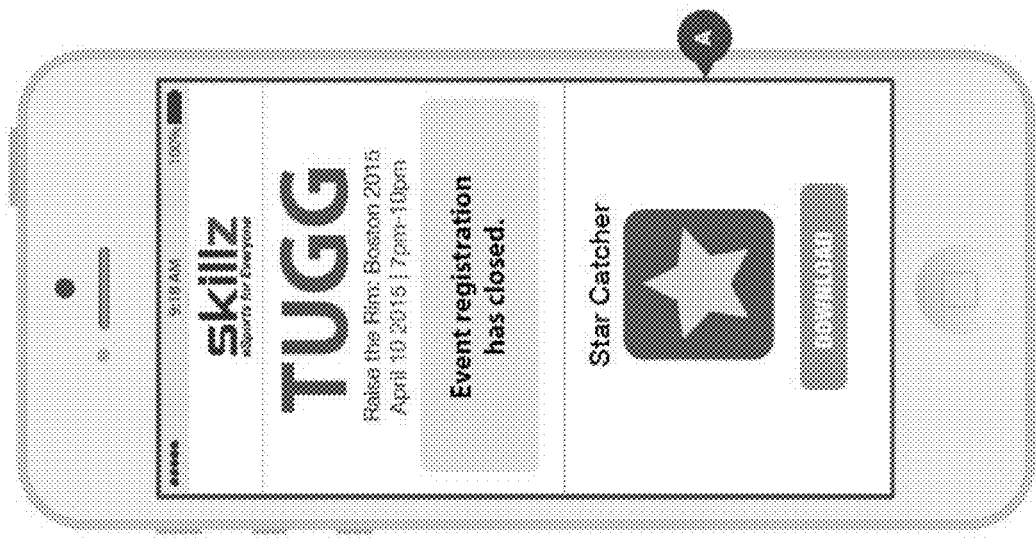
Figure 30:
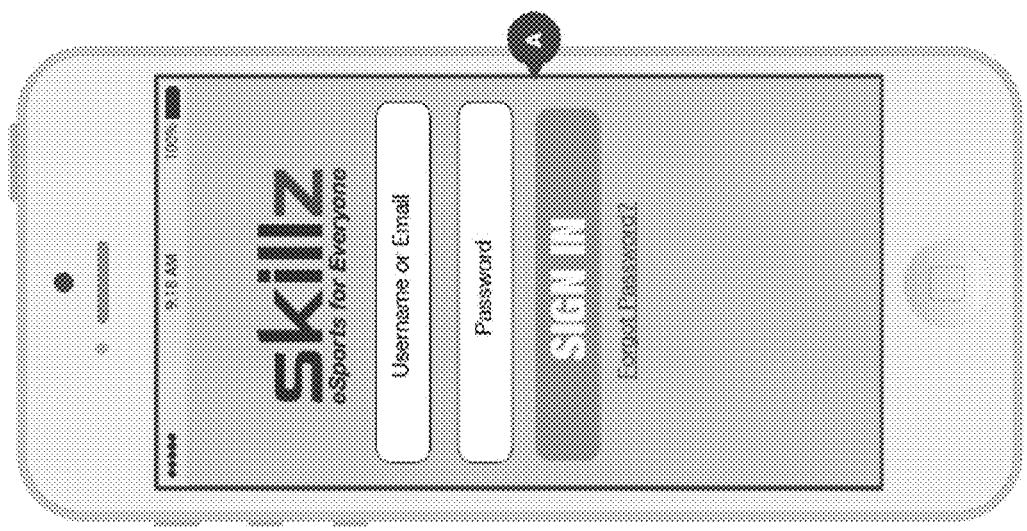
Figure 31:
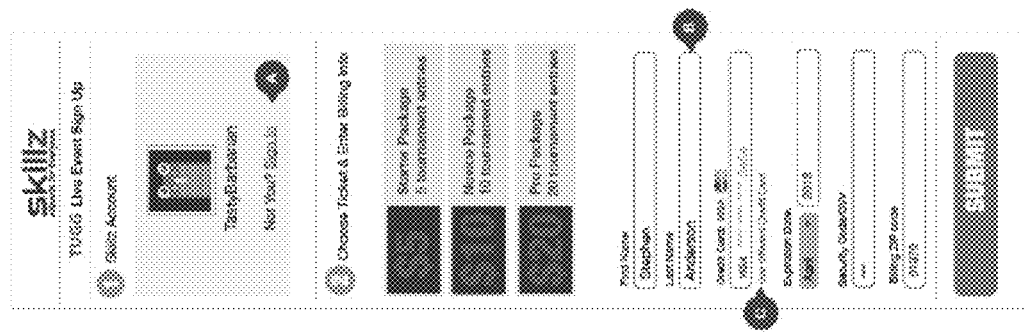
Figure 32:
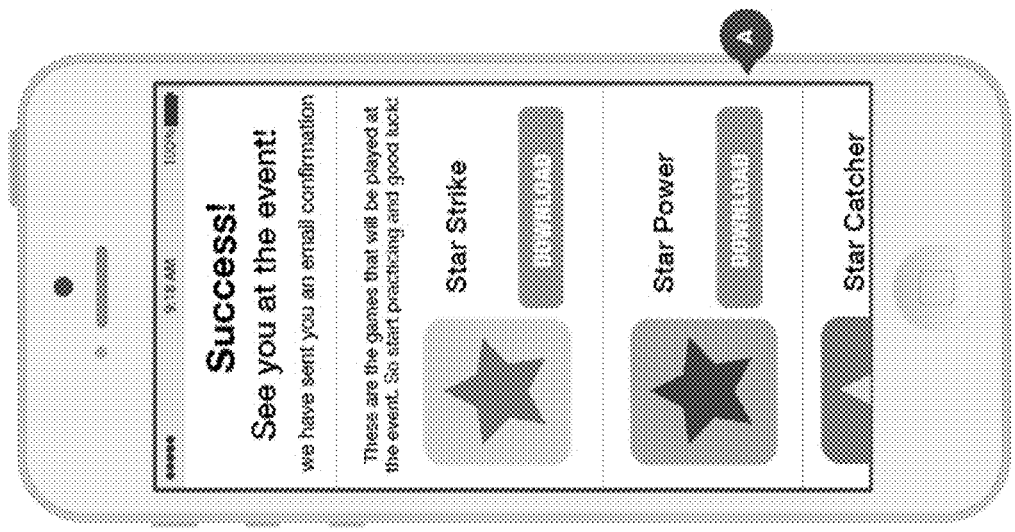
Figure 33:
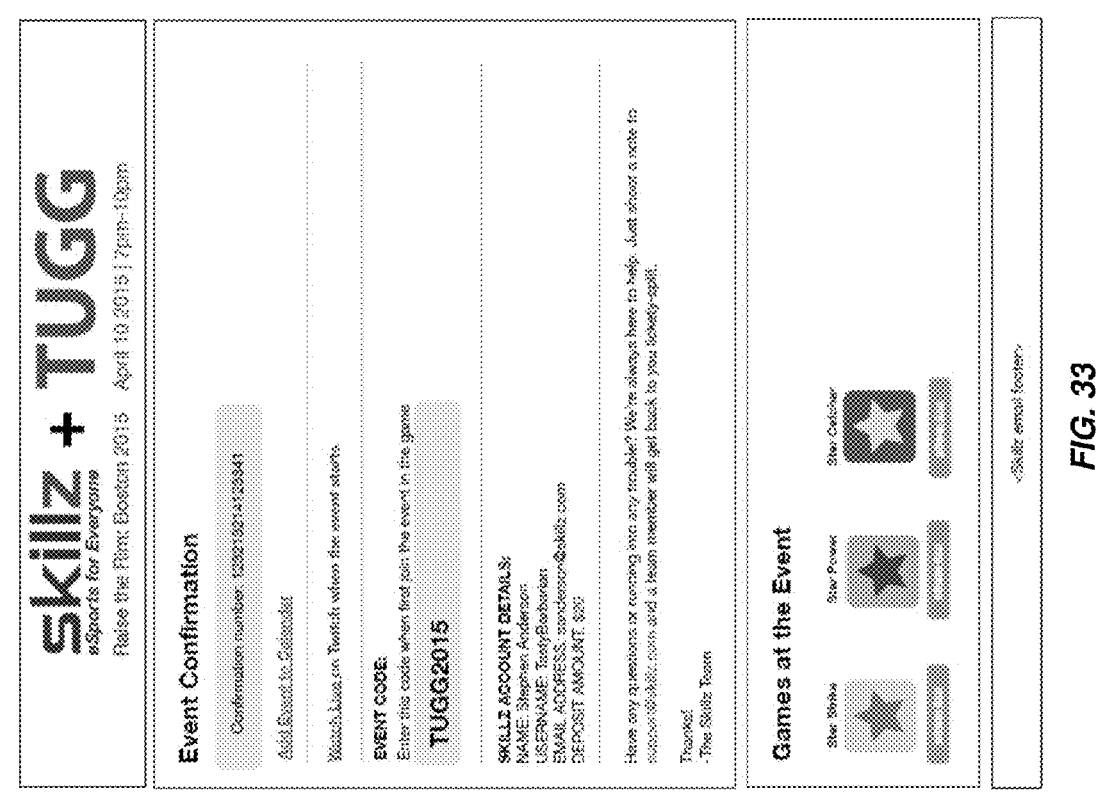
Figure 34:
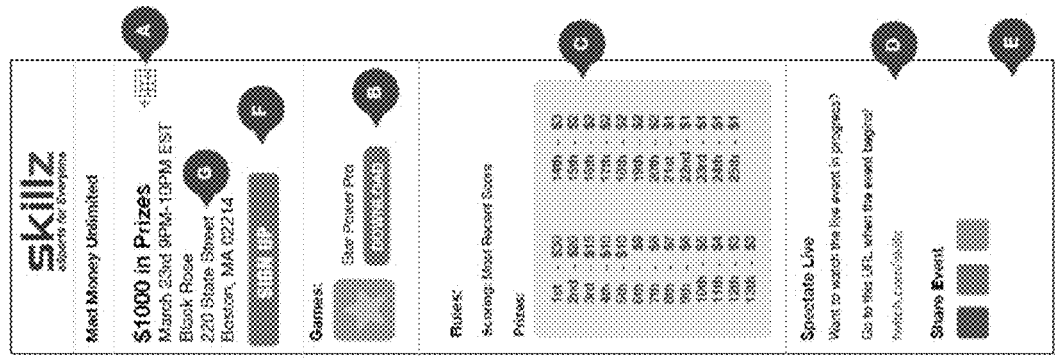

FIGS. 26-34 illustrate interfaces for players $210_i$ to sign up/register for an event. FIG. 26 illustrates a client $220_i$ with an example interface of a peer-to-peer gaming platform $240_i$ for a user to sign up for a p2p live event. The interface can display a co-branded logo (for example, as uploaded by an organizer using event portal 270), marking message, event time, and GUI elements for signing up or signing in. FIG. 27 illustrates an interface for a new user to sign up to peer-to-peer gaming services and peer-to-peer live event. FIG. 28 illustrates an interface for displaying a message to a user when the user has successfully registered for a live event, including a list of games that are available for playing at the event and links to download those games if the user does not already have the game software application. FIG. 29 illustrates an interface for displaying a message to a user when event registration has closed. FIG. 30 illustrates an interface for displaying a login prompt for an existing user to log into the peer-to-peer gaming platform $240_i$. FIG. 31 illustrates an interface for an existing user to register for a peer-to-peer live event, including paying an entry fee. FIG. 32 illustrates an interface for displaying a message to the existing user that they have successfully registered for the live event. FIG. 33 illustrates content of a message for confirming event registration to a user. FIG. 34 illustrates an interface for displaying event details using the peer-to-peer gaming platform $240_i$.

Figure 35:
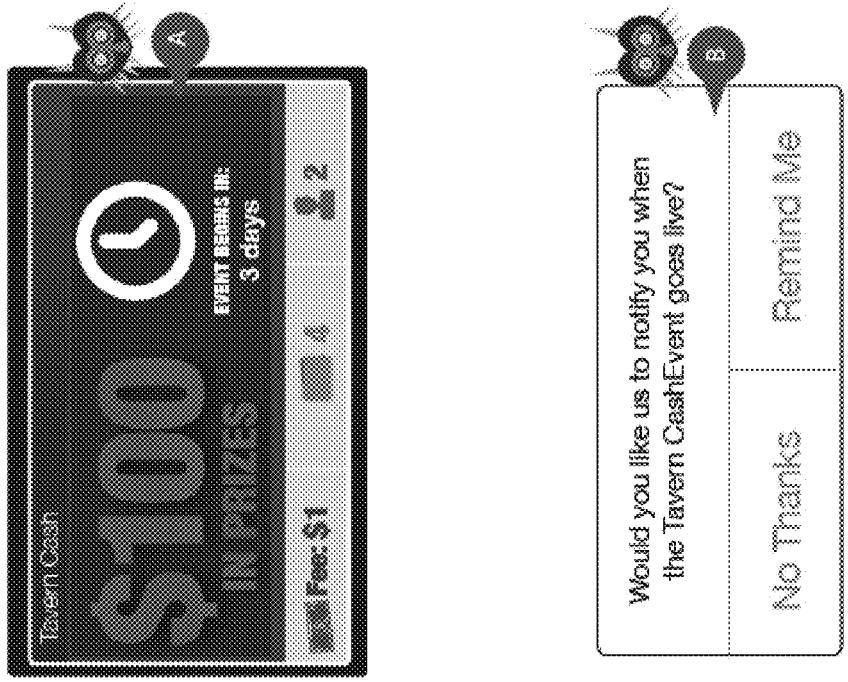
FIGS. 35-39 illustrate interfaces for display on clients before, during, and after live peer-to-peer events.

FIGS. 35-39 illustrate interfaces for display on clients $220_i$ before, during, and after live peer-to-peer events. FIG. 35 illustrates two interfaces for reminding a user that a peer-to-peer live event is available for participation (either pre- or post-registration). At top, an upcoming live/local event can be displayed in a live events match select category on a user interface. Display time and hierarchy order can be controlled based on least amount of time until event goes live. At bottom, selecting an upcoming event can prompt the user to be notified when the event is about to begin. If a user selects to be reminded, they can receive push notifications before the event, for example at 12 hours, 6 hours and 1 hour before the event goes live.

Figure 36:
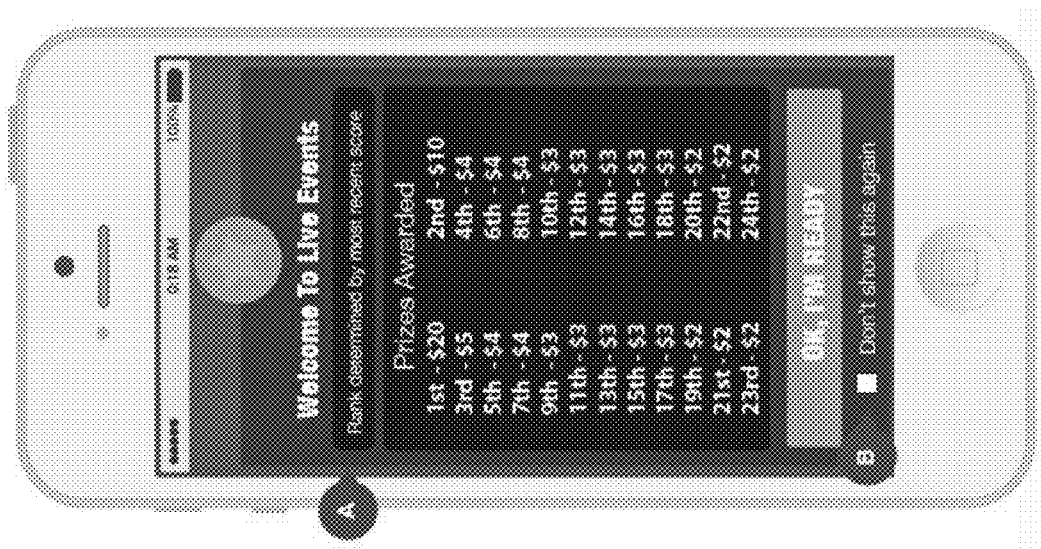
Figure 37:
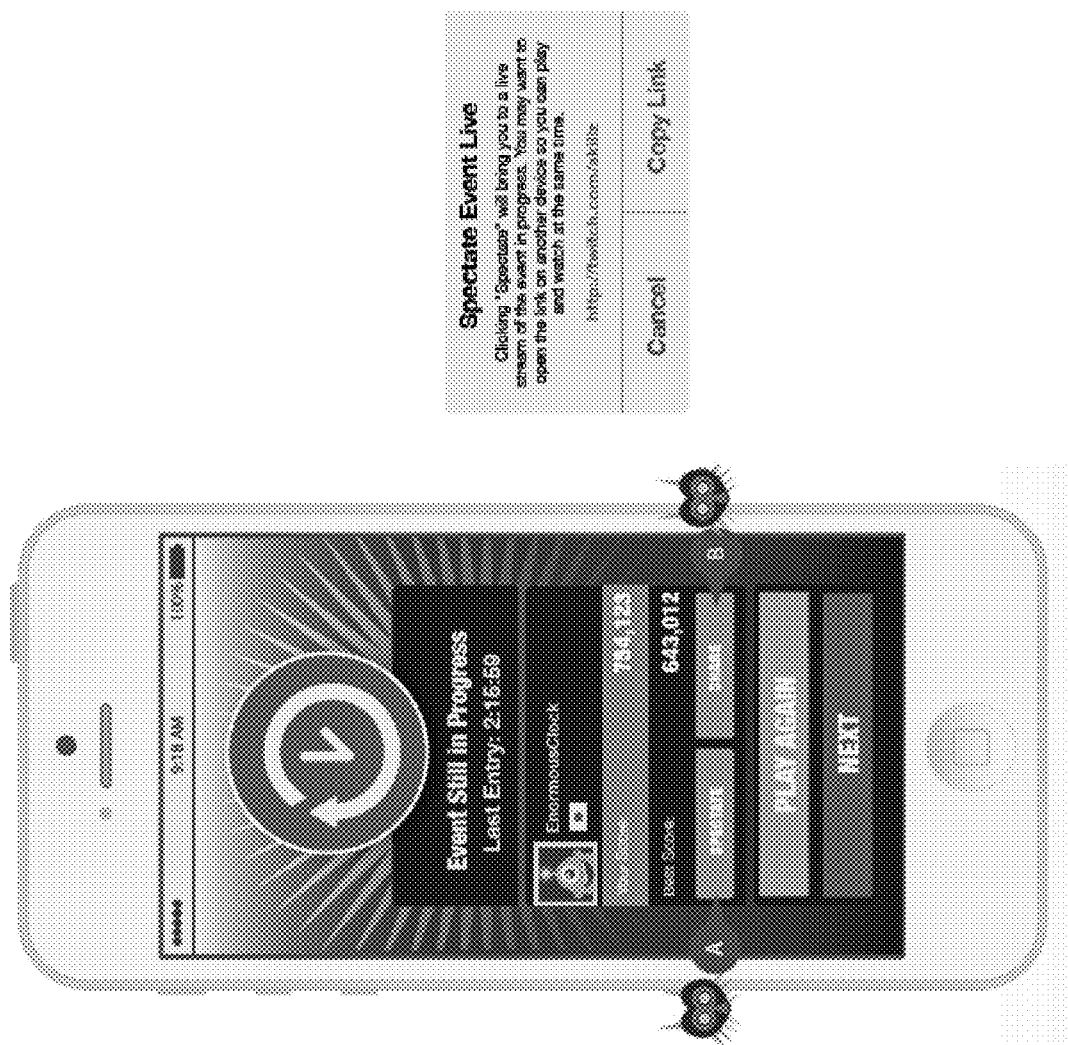
Figure 38:
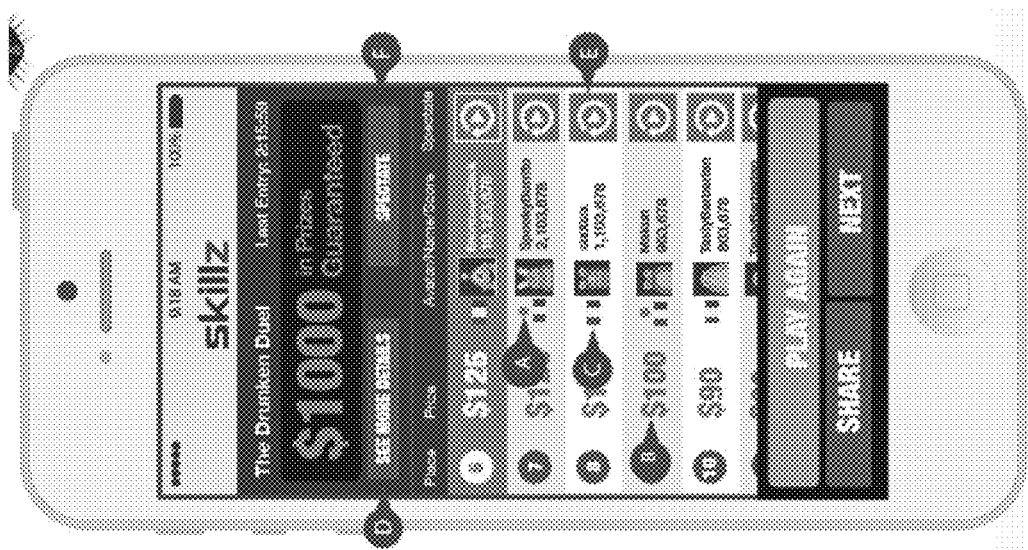
Figure 39:
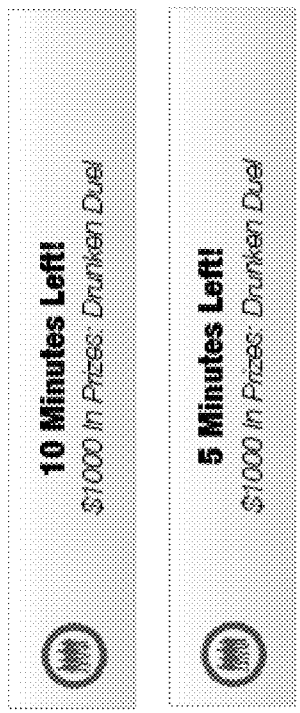

FIG. 36 illustrates an interface for a peer-to-peer gaming platform $240_i$ display in which the live event rules are displayed including the paradigm by which scoring is determined, and an opt-out message for each unique event. FIG. 37 illustrates an interface for a peer-to-peer gaming platform $240_i$ displaying details of an event in progress, including links to spectate the event and share the event. FIG. 38 illustrates an interface for displaying a leaderboard during a live event. When a user is currently playing a game, an icon can be displayed besides their avatar. Prizes to be paid out assuming the leader board reflects the final outcome of the gaming competition can be displayed. The list of users can be displayed by current place or rank in the gaming competition. Links are provided to spectate each player's gameplay. In an example implementation, the replay for a non-player user can show opponents game versus the player's game and replay for a player user can show the player's game versus the current first place game. FIG. 39 illustrates example interfaces for two notifications to be displayed during a live event. The notifications can display a message to event participants that the event will end in 10 minutes and/or 5 minutes.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by at least one data processor forming part of at least one computing system, the method comprising:

receiving, by at least one data processor, data identifying a peer-to-peer gaming event and comprising a request to register for the peer-to-peer gaming event, the request originating from peer-to-peer gaming platform software stored in memory of a client and executing on the client, the client being remote from the data least one data processor, the peer-to-peer event being a geographically restricted peer-to-peer gaming competition having a plurality of participants each playing a skill-based digital game;

associating, using the at least one data processor, the client with the peer-to-peer gaming event;

receiving data characterizing a location of the client according to a geolocation system of the client, wherein the geolocation system of the client is a global positioning system (GPS) service or a local positioning system (LPS) utilizing beacons; and comparing the location of the client to a predefined geolocation of the peer-to-peer event to determine, using the at least one data processor, that the client satisfies a geographical location requirement of the peer-to-peer gaming event; and causing, using the at least one data processor, provision of the skill-based digital game to the client during the peer-to-peer gaming event, the skill-based digital game exchanging game data with a game server remote from the at least one data processor and the client.

2. The method of claim 1, wherein the skill-based digital game is a single player game or a multiplayer game.

3. The method of claim 1, further comprising:
generating, using the at least one data processor, a video feed recording in-game actions by, using the peer-to-peer gaming platform, capturing an interface display space of the skill-based digital game and broadcasting the capture to peer-to-peer gaming platforms of one or more additional clients participating in the peer-to-peer event.

4. The method of claim 3, wherein generating the video feed includes simultaneously broadcasting the capture and a second capture of in-game actions of another client to enable comparison of the in-game actions between participants of the peer-to-peer gaming event.

5. The method of claim 4, wherein the another client is selected based on a ranking of performance of the second client in the peer-to-peer gaming competition.

6. The method of claim 1, further comprising:
accessing, using at least one data processor, data characterizing historical skill-based gaming metrics for one or more peer-to-peer event participants and historical skill-based gaming metrics for a potential peer-to-peer event participant;
determining, by at least one data processor and using the accessed data, a targeted advertisement to present to the potential peer-to-peer event participant, the targeted advertisement specifying the skill-based digital game and a characterization of the historical skill-based gaming metrics for the one or more peer-to-peer event participants; and
causing to be modified, by at least one data processor, an advertisement display space to include the targeted advertisement, the targeted advertisement prompting the potential peer-to-peer event participant to, using a peer-to-peer gaming platform, request to register for the peer-to-peer event.

7. The method of claim 1, further comprising:
securing, using the at least one data processor and for a user associated with the client, funds previously deposited by the user as an event entry fee;
transmitting, using the at least one data processor, data characterizing a confirmation that the funds were successfully secured;
receiving, using the at least one data processor, data characterizing an outcome of the peer-to-peer event; and
transferring, using the at least one data processor, at least a portion of the secured funds to an account associated with an event participant.

8. The method of claim 1, wherein the peer-to-peer gaming platform software executing on the client provides a random number seed to an operating system independent random number generator so that an initial state of the skill-based digital game is consistent for the plurality of participants.

9. The method of claim 1, wherein the peer-to-peer competition includes the plurality of participants concurrently playing the skill-based digital game.

10. A non-transitory computer program product storing instructions, which when executed by at least one data processor of at least one computing system, implement a method comprising:
receiving, by at least one data processor, data identifying a peer-to-peer gaming event and comprising a request to register for the peer-to-peer gaming event, the request originating from peer-to-peer gaming platform software stored in memory of a client and executing on the client, the client being remote from the data least one data processor, the peer-to-peer event being a geographically restricted peer-to-peer gaming competition having a plurality of participants each playing a skill-based digital game;
associating, using the at least one data processor, the client with the peer-to-peer gaming event;
receiving data characterizing a location of the client according to a geolocation system of the client, wherein the geolocation system of the client is a global positioning system (GPS) service or a local positioning system (LPS) utilizing beacons; and
comparing the location of the client to a predefined geolocation of the peer-to-peer event to determine, using the at least one data processor, that the client satisfies a geographical location requirement of the peer-to-peer gaming event; and
causing, using the at least one data processor, provision of the skill-based digital game to the client during the peer-to-peer gaming event, the skill-based digital game exchanging game data with a game server remote from the at least one data processor and the client.

11. The computer program product of claim 10, wherein the skill-based digital game is a single player game or a multiplayer game.

12. The computer program product of claim 10, the method further comprising:
generating, using the at least one data processor, a video feed recording in-game actions by, using the peer-to-peer gaming platform, capturing an interface display space of the skill-based digital game and broadcasting the capture to peer-to-peer gaming platforms of one or more additional clients participating in the peer-to-peer event.

13. The computer program product of claim 12, wherein generating the video feed includes simultaneously broadcasting the capture and a second capture of in-game actions of another client to enable comparison of the in-game actions between participants of the peer-to-peer gaming event.

14. The computer program product of claim 13, wherein the another client is selected based on a ranking of performance of the second client in the peer-to-peer gaming competition.

15. The computer program product of claim 10, the method further comprising:
accessing, using at least one data processor, data characterizing historical skill-based gaming metrics for one or more peer-to-peer event participants and historical skill-based gaming metrics for a potential peer-to-peer event participant;
determining, by at least one data processor and using the accessed data, a targeted advertisement to present to the potential peer-to-peer event participant, the targeted advertisement specifying the skill-based digital game and a characterization of the historical skill-based gaming metrics for the one or more peer-to-peer event participants; and causing to be modified, by at least one data processor, an advertisement display space to include the targeted advertisement, the targeted advertisement prompting the potential peer-to-peer event participant to, using a peer-to-peer gaming platform, request to register for the peer-to-peer event.

16. The computer program product of claim 10, the method further comprising:
securing, using the at least one data processor and for a user associated with the client, funds previously deposited by the user as an event entry fee;
transmitting, using the at least one data processor, data characterizing a confirmation that the funds were successfully secured;
receiving, using the at least one data processor, data characterizing an outcome of the peer-to-peer event; and
transferring, using the at least one data processor, at least a portion of the secured funds to an account associated with an event participant.

17. The computer program product of claim 10, wherein the peer-to-peer gaming platform software executing on the client provides a random number seed to an operating system independent random number generator so that an initial state of the skill-based digital game is consistent for the plurality of participants.

18. The computer program product of claim 10, wherein the peer-to-peer competition includes the plurality of participants concurrently playing the skill-based digital game.

19. A system comprising:
at least one data processor;
memory storing instructions which, when executed by the at least one data processor, causes the at least one data processor to perform operations comprising:
receiving, by the at least one data processor, data identifying a peer-to-peer gaming event and comprising a request to register for the peer-to-peer gaming event, the request originating from peer-to-peer gaming platform software stored in memory of a client and executing on the client, the client being remote from the data least one data processor, the peer-to-peer event being a geographically restricted peer-to-peer gaming competition having a plurality of participants each playing a skill-based digital game;
associating, using the at least one data processor, the client with the peer-to-peer gaming event;
receiving data characterizing a location of the client according to a geolocation system of the client wherein the geolocation system of the client is a global positioning system (GPS) service or a local positioning system (LPS) utilizing beacons; and
comparing the location of the client to a predefined geolocation of the peer-to-peer event to determine, using the at least one data processor, that the client satisfies a geographical location requirement of the peer-to-peer gaming event; and
causing, using the at least one data processor, provision of the skill-based digital game to the client during the peer-to-peer gaming event, the skill-based digital game exchanging game data with a game server remote from the at least one data processor and the client.

20. The system of claim 19, wherein the skill-based digital game is a single player game or a multiplayer game.

21. The system of claim 19, the operations further comprising:
generating, using the at least one data processor, a video feed recording in-game actions by, using the peer-to-peer gaming platform, capturing an interface display space of the skill-based digital game and broadcasting the capture to peer-to-peer gaming platforms of one or more additional clients participating in the peer-to-peer event.

22. The system of claim 21, wherein generating the video feed includes simultaneously broadcasting the capture and a second capture of in-game actions of another client to enable comparison of the in-game actions between participants of the peer-to-peer gaming event.

23. The system of claim 22, wherein the another client is selected based on a ranking of performance of the second client in the peer-to-peer gaming competition.

24. The system of claim 19, the operations further comprising:
accessing, using at least one data processor, data characterizing historical skill-based gaming metrics for one or more peer-to-peer event participants and historical skill-based gaming metrics for a potential peer-to-peer event participant;
determining, by at least one data processor and using the accessed data, a targeted advertisement to present to the potential peer-to-peer event participant, the targeted advertisement specifying the skill-based digital game and a characterization of the historical skill-based gaming metrics for the one or more peer-to-peer event participants; and
causing to be modified, by at least one data processor, an advertisement display space to include the targeted advertisement, the targeted advertisement prompting the potential peer-to-peer event participant to, using a peer-to-peer gaming platform, request to register for the peer-to-peer event.

* * * * *